United States Patent [19]
Olarig

[11] Patent Number: 6,018,810
[45] Date of Patent: Jan. 25, 2000

[54] FAULT-TOLERANT INTERCONNECTION MEANS IN A COMPUTER SYSTEM

[75] Inventor: Sompong P. Olarig, Cypress, Tex.

[73] Assignee: Compaq Computer Corporation, Houston, Tex.

[21] Appl. No.: 08/989,450

[22] Filed: Dec. 12, 1997

[51] Int. Cl.⁷ ............................. G06F 11/00; G06F 13/40
[52] U.S. Cl. ................ 714/43; 714/48; 710/126
[58] Field of Search ..................... 710/100, 126, 710/127, 129; 714/1, 40, 43, 47, 48, 52, 53

[56] References Cited

U.S. PATENT DOCUMENTS

| | | | |
|---|---|---|---|
| 5,361,267 | 11/1994 | Godiwala et al. | 371/40.1 |
| 5,701,409 | 12/1997 | Gates | 395/183.17 |
| 5,724,528 | 3/1998 | Kulik et al. | 395/308 |
| 5,764,924 | 6/1998 | Hong | 395/281 |
| 5,781,918 | 7/1998 | Lieberman et al. | 711/5 |
| 5,867,645 | 2/1999 | Olarig | 395/185.01 |
| 5,884,027 | 3/1999 | Garbus et al. | 395/200.8 |

*Primary Examiner*—Ayaz R. Sheikh
*Assistant Examiner*—Jigaur Pancholi
*Attorney, Agent, or Firm*—Paul N. Katz; Ronald L. Chichester; Frohwitter

[57] ABSTRACT

A fault tolerant 64-bit data-width peripheral component interconnect (PCI) bus system in a computer system that may recover from a fault(s) occurring on either the upper or lower 32-bit portions of a 64-bit data-width PCI bus. When a parity error is detected on one of either the upper or lower 32-bit portions of the 64-bit data-width PCI bus, the 32-bit portion not having the parity error is used to transfer data and the one having the parity error is inhibited from further use. The PCI bus may be dynamically configured for transfer of data at 64-bits per clock, or at 32-bits per clock over either the upper or lower portions of the PCI bus. New signals SWAP# and SWAP_ACK# are used to accomplish the fault tolerant operation. 64-bit disable and swap enable bits in a PCI device command register are used to disable 64-bit data transfer, and swap data transfer from the lower portion to the upper portion of the PCI bus, respectively. The 64-bit disable and swap enable bits may also be set during a "built-in-self-test" (BIST) during startup or diagnostic testing of the computer system.

8 Claims, 19 Drawing Sheets

| Byte 3 | Byte 2 | Byte 1 | Byte 0 | |
|---|---|---|---|---|
| Device ID | | Vendor ID | | 00h |
| Status | | Command | | 04h |
| Class Code | | | Revision ID | 08h |
| Bist | Header Type | Latency Timer | Cache Line Size | 0Ch |
| Base Address Registers | | | | 10h |
| | | | | 14h |
| | | | | 18h |
| | | | | 1Ch |
| | | | | 20h |
| | | | | 24h |
| Cardbus CIS Pointer | | | | 28h |
| Subsystem ID | | Subsystem Vendor ID | | 2Ch |
| Expansion ROM Base Address | | | | 30h |
| Reserved | | | | 34h |
| Reserved | | | | 38h |
| Max_Lat | Min_GNT | Inter. Pin | Inter. Line | 3Ch |

FIG. 4

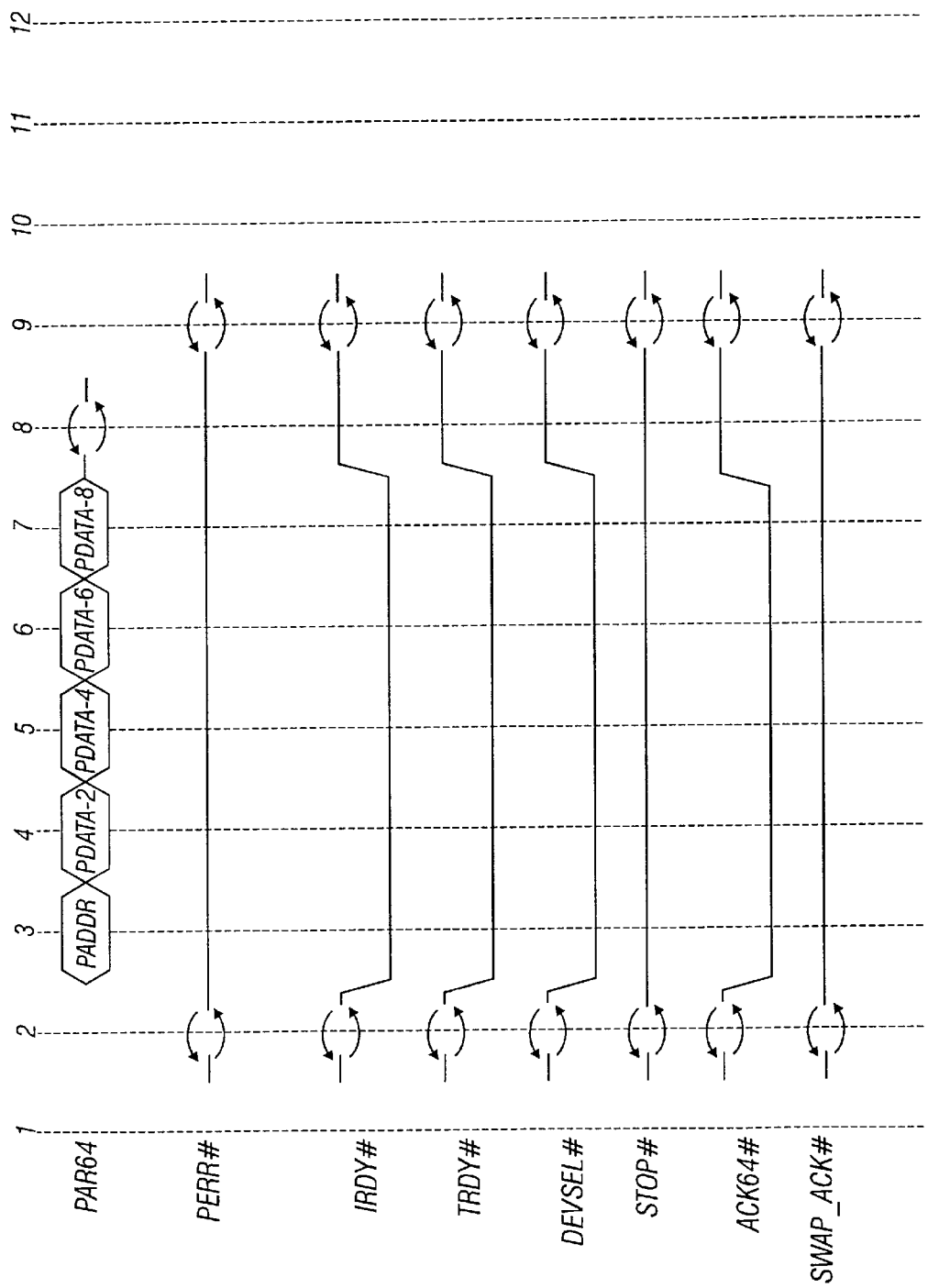

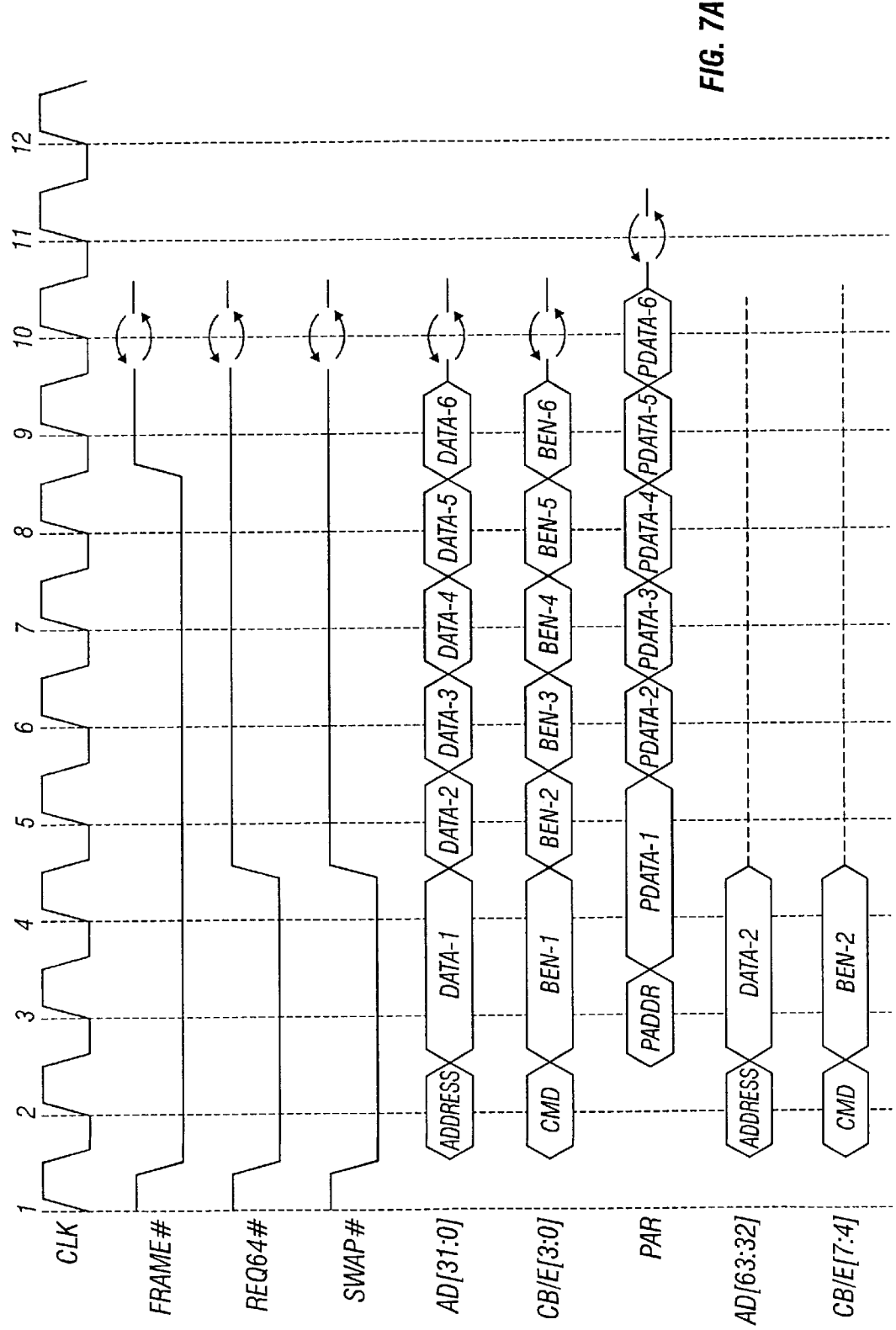

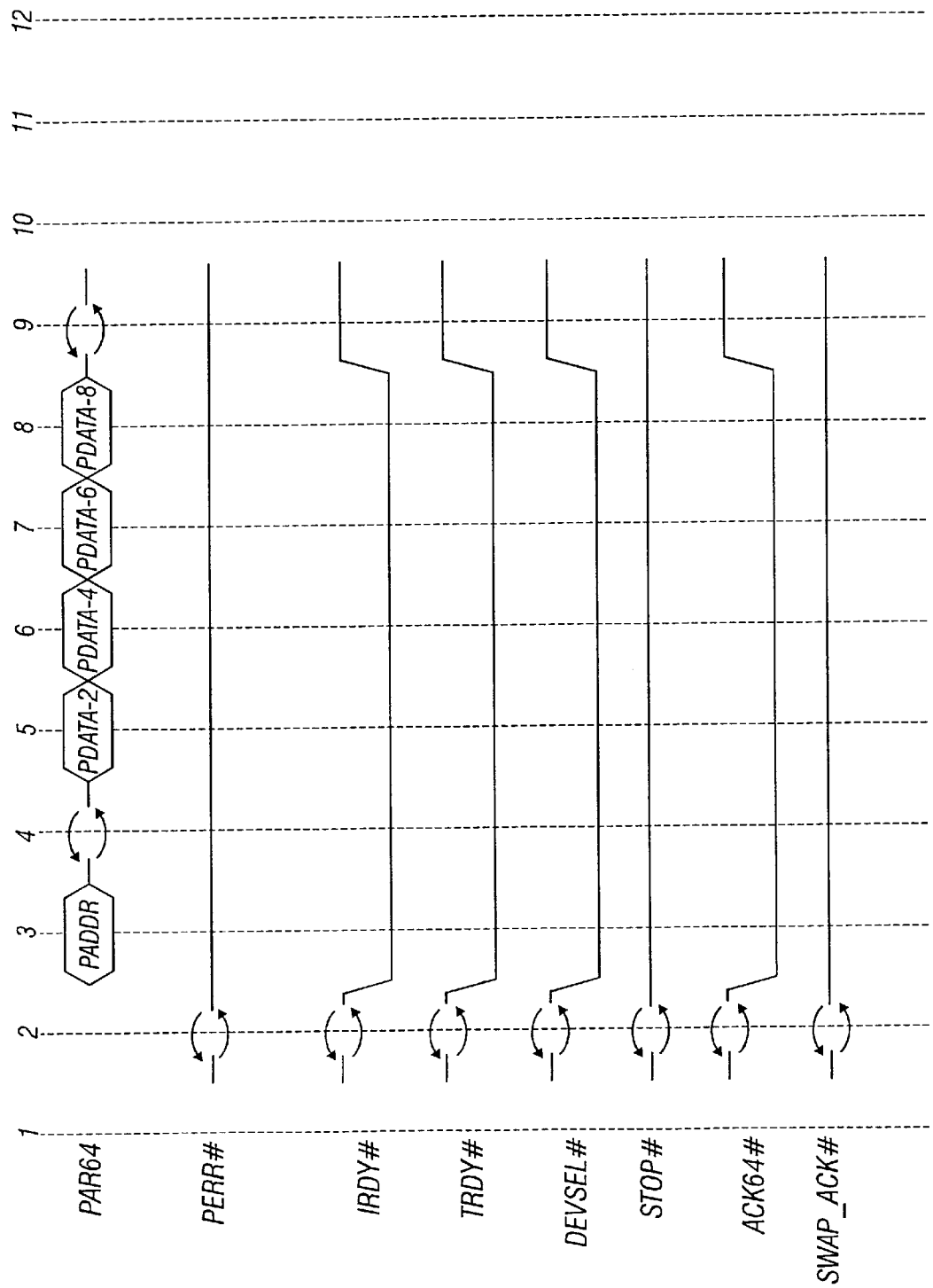

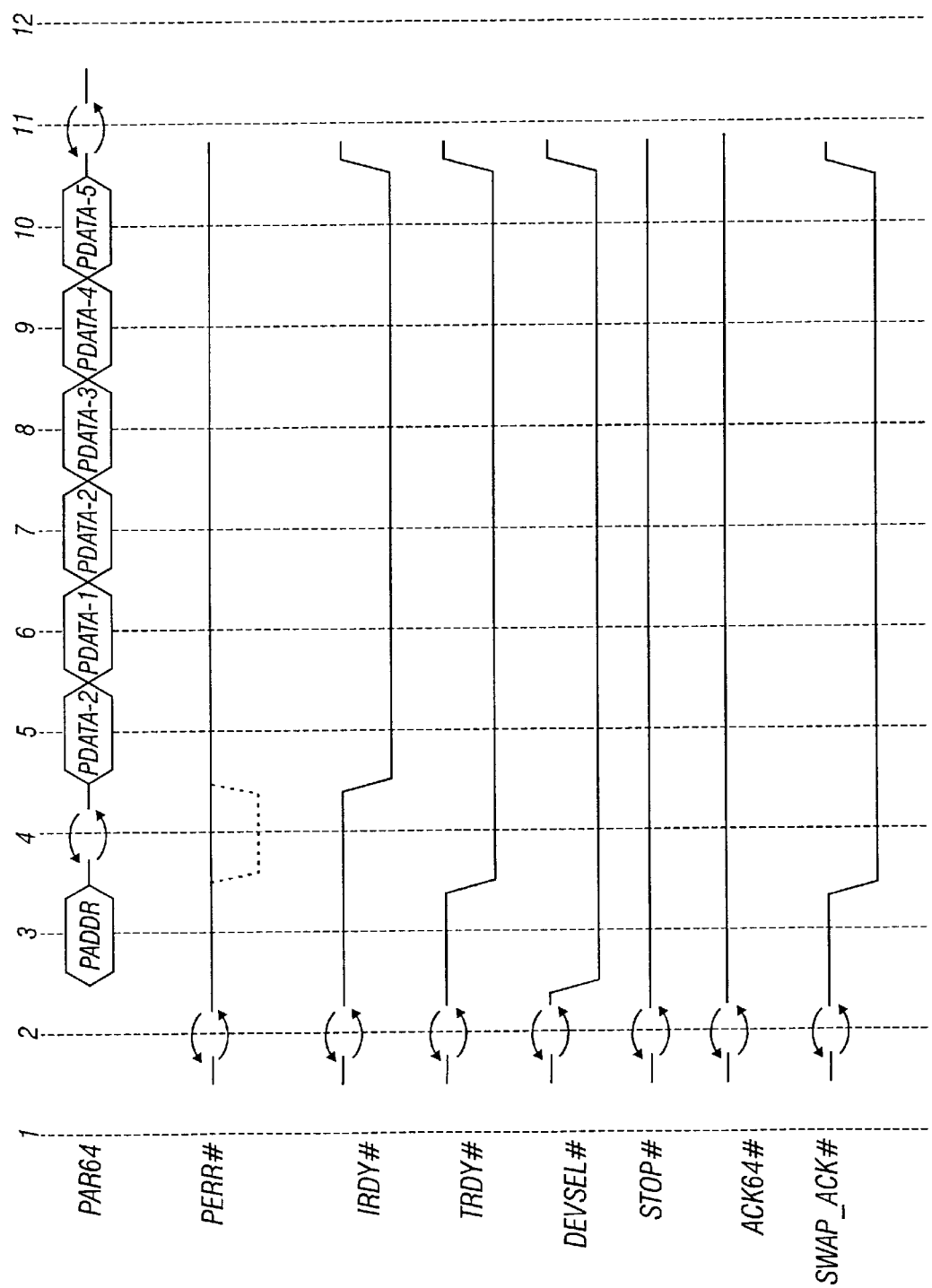

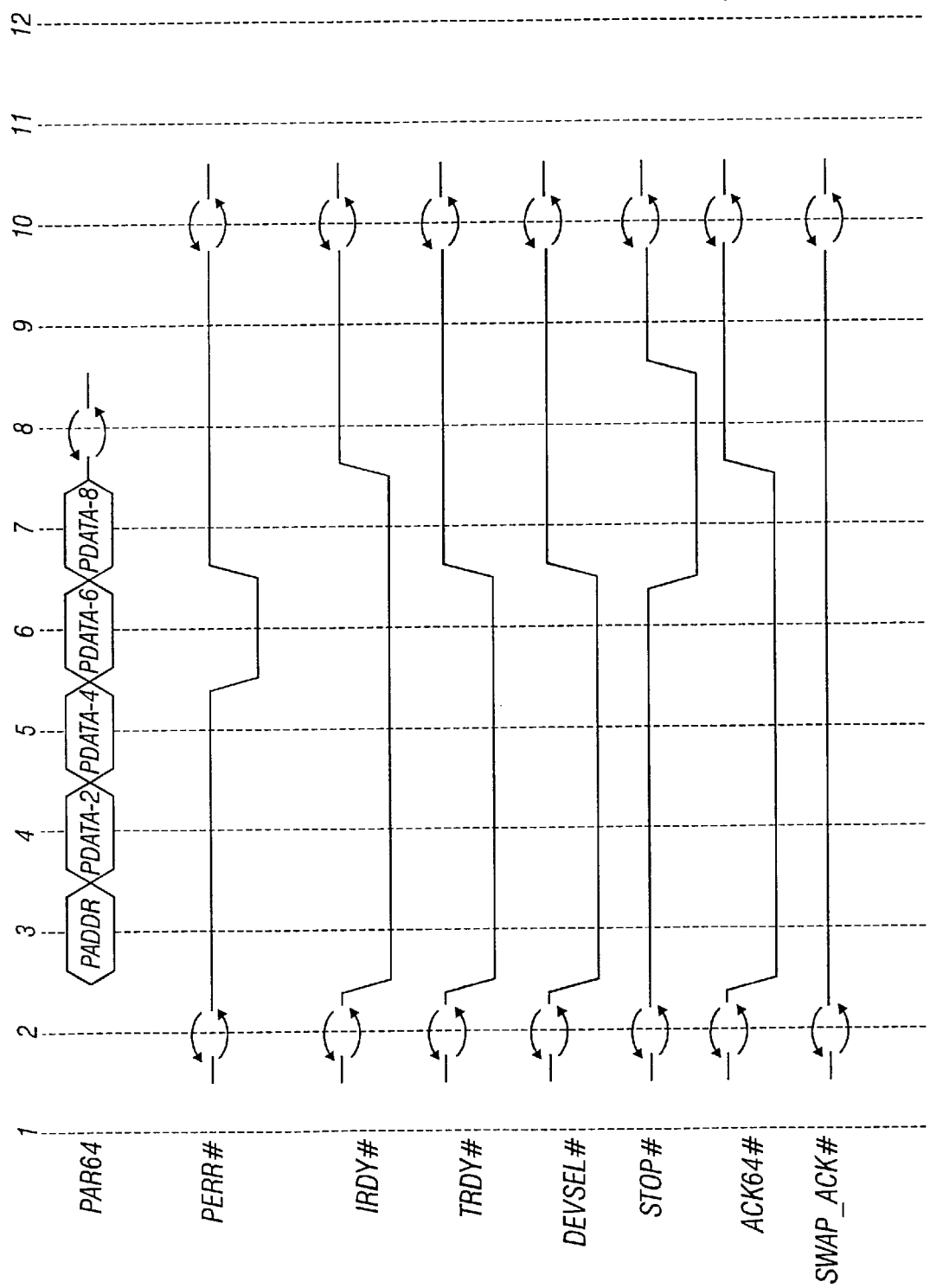

FAULT-TOLERANT INTERCONNECTION MEANS IN A COMPUTER SYSTEM

CROSS REFERENCE TO RELATED PATENT APPLICATION

This patent application is related to U.S. patent application Ser. No. 08/723,767, filed Sep. 30, 1996, entitled "A Fault-Tolerant Bus System" by Sompong P. Olarig, and is hereby incorporated by reference.

BACKGROUND OF THE INVENTION

1. Field of the Invention

The present invention relates to computer systems using information buses to interface a central processor(s), random access memory and input-output peripherals together, and more particularly, in utilizing in a computer system a fault-tolerant interconnection system for a plurality of peripheral component interconnect (PCI) devices.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. These PCI specifications and ECN are available from the PCI Special Interest Group, P.O. Box 14070, Portland, Oreg. 97214.

A computer system uses a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) (CPU) of the computer system communicates with main memory and with the peripherals that make up the computer system over these various buses. The microprocessor(s) communicate(s) to the main memory over a host bus to memory bus bridge. The main memory generally communicates over a memory bus through a cache memory bridge to the CPU host bus. The peripherals, depending on their data transfer speed requirements, are connected to the various buses which are connected to the microprocessor host bus through bus bridges that detect required actions, arbitrate, and translate both data and addresses between the various buses.

The choices available for the various computer system bus structures and devices residing on these buses are relatively flexible and may be organized in a number of different ways. One of the more desirable features of present day personal computer systems is their flexibility and ease in implementing custom solutions for users having widely different requirements. Slower peripheral devices may be connected to the ISA or EISA bus(es), other peripheral devices, such as disk and tape drives may be connected to a SCSI bus, and the fastest peripheral devices such as network interface cards (NICs) and video graphics controllers may require connection to the PCI bus. Information transactions on the PCI bus may operate at 33 MHz or 66 MHz clock rates and may be either 32 or 64 bit transactions.

The PCI 2.1 Specification supports a high 32 bit bus, referred to as the 64 bit extension to the standard low 32 bit bus. The 64 bit bus provides additional data bandwidth for PCI devices that require it. The high 32 bit extension for 64 bit devices requires an additional 39 signal pins: REQ64#, ACK64#, AD[63:32], C/BE[7:4]#, and PAR64. These signals are defined more fully in the PCI 2.1 Specification incorporated by reference hereinabove. 32 bit PCI devices work unmodified with 64 bit PCI devices. A 64 bit PCI device must default to 32 bit operation unless a 64 bit transaction is negotiated. 64 bit transactions on the PCI bus are dynamically negotiated (once per transaction) between the master and target PCI devices. This is accomplished by the master asserting REQ64# and the target responding to the asserted REQ64# by asserting ACK64#. Once a 64 bit transaction is negotiated, it holds until the end of the transaction. Signals REQ64# and ACK64# are externally pulled up by pull up resistors to ensure proper behavior when mixing 32 bit and 64 bit PCI devices on the PCI bus. A central resource controls the state of REQ64# to inform the 64 bit PCI device that it is connected to a 64 bit bus. If REQ64# is deasserted when RST# is deasserted, the PCI device is not connected to a 64 bit bus. If REQ64# is asserted when RST# is deasserted, the PCI device is connected to a 64 bit bus.

Many components and connections are required for operation of the features inherent in today's computer systems. Miniaturization and automated assembly have decreased the cost of computers, but sometimes create latent malfunctions later during operation of the computer system. Typically, printed circuit boards having conductive patterns are used to interconnect integrated circuit packages such as a ball grid array (BGA) using surface mount techniques. There may be hundreds of contacts (tiny solder balls) on a BGA package and each must be properly connected to respective connections of the conductive patterns on the printed circuit boards of the computer system. Some problems that may not be found during manufacture, or may develop later during operation of the computer system are shorted or open connections between the contacts of the BGA package. Unless pattern sensitive tests are run, an open connection may appear as the correct logic level, and shorted connections may not be noticed if the same logic level is on the shorted connections. Devices in the integrated circuit packages of the computer system also may either short or open, giving an erroneous signal. Generation and checking of parity is a way of detecting data transmission malfunctions in the computer system.

The PCI Specification requires generation of parity information for all PCI devices that drive address and/or data information onto the address/data (AD[31:0]) bus. The PCI AD[31:0] bus is a time-multiplexed address/data bus. During the address phase of a PCI transaction, the AD[31:0] bus carries the start address of the PCI transaction. The Command or Byte Enable bus (C/BE#[3:0]), defines the type of transaction to be performed. A Parity signal (PAR) is driven by the initiator one clock after completion of the address phase either high or low to ensure even parity with the AD[31:0] bus and the C/BE#[3:0] bus for a total of 37 bits having an even parity, i.e., the number of logic "1s" on the combined 37 bit bus is an even number.

During the data phase(s) of the PCI transaction, the AD[31:0] bus is driven by the initiator (during a write transaction) or the currently-addressed target (during a read transaction). The C/BE#[3:0] bus is driven by the initiator to indicate the bytes to be transferred within the currently-addressed doubleword ([31:0]) and the data paths to be used to transfer the data. PAR is driven by either the initiator (during a write transaction) or the currently-addressed target (during a read transaction) so that the combination of AD[31:0], C/BE#[3:0] and PAR (37 bits total) has an even parity (an even number of logic "1s"). For 64 bit data transfers the upper address/data bus AD[61:32]) and C/BE# [7:4], in conjunction with the lower address/data bus AD[31:0] and C/BE#[3:0], are utilized to transfer a quadword (64 bits) of data. An upper Parity signal (PAR64) is used in combination with the AD[61:32] and C/BE#[7:4] buses to represent an even parity across these upper 37 bits.

The bus agent receiving the data (target on a write transaction or initiator on a read transaction) must calculate whether a parity bit should be a logic "1" or a logic "0" to produce an even parity based upon the number of logic "1s" received on the combination of the AD and C/BE buses. If the calculated parity bit does not match the logic value of the asserted PAR or PAR64 for the upper bus, then a parity error has occurred. The PCI Specification defines a parity error signal (PERR#) to indicate that a parity error has occurred on either or both of the upper AD[63:32] and CB/E#[7:4] buses, or lower AD[31:0] and CB/E#[3:0] buses during a data phase. PERR# does not indicate which of these buses has the data parity error.

The PCI Specification permits recovery from data phase parity errors. Recovery from a data phase parity error may be attempted by the PCI master, the device driver or by the operating system. The PCI Specification recommends that the recovery be attempted at the lowest possible level (i.e., by the bus master). If the data phase parity error cannot be recovered from, the parity error must be reported to the operating system.

Operation of the 64 bit PCI bus and PCI devices are more fully described in commonly owned U.S. patent application Ser. No. 08/723,767, filed Sep. 30, 1996, entitled "A Fault-Tolerant Bus System" by Sompong P. Olarig, and is hereby incorporated by reference above. The invention disclosed in this patent application recovers from an operating fault on the upper 32-bit portion of a 64-bit PCI bus by transferring data and control information only on the operating lower 32-bit portion of the 64-bit PCI bus, however, no recovery is possible when the fault is on the lower 32-bit portion thereof.

What is needed is an apparatus, method, and system for improving fault tolerance on a 64-bit data-width PCI bus when either the upper or lower 32-bit data-width portions of the 64-bit data-width PCI bus may have an operating fault.

SUMMARY OF THE INVENTION

The present invention overcomes the above-identified problems as well as other shortcomings and deficiencies of existing technologies by providing in a computer system a fault tolerant 64-bit data-width PCI bus system that may recover from a fault(s) occurring on either the upper or lower 32-bit portions of a 64-bit data-width PCI bus. A 64-bit data-width PCI transaction is negotiated in accordance with the aforementioned PCI Specification except that new side-band signals SWAP# and SWAP_ACK# are utilized in the present invention. During the PCI transaction address phase a 32-bit address is asserted on both the lower address/data (AD[31:0]) bus and the upper address/data (AD[63:32]) bus. The value of this 32-bit address is the same on both the upper and lower address/data buses. The present invention supports a 32-bit address, Single Address Cycle (SAC) and a 64-bit address, Dual Address Cycle (DAC). During the address phase of the 64-bit data-width PCI transaction, the PCI bus master, according to the present invention, may assert both the REQ64# and SWAP# signals on the PCI bus. The PCI target may respond to the asserted REQ64# and SWAP# signals by asserting a) the ACK64#, or else b) the SWAP_ACK#, or c) neither ACK64# nor SWAP_ACK#. These three target responses correspond to the target being ready, after also asserting DEVSEL# and TRDY#, to transfer data at a) 64-bits across both the upper AD[63:32] and lower AD[31:0] buses, b) 32-bits across only the upper AD[63:32] bus, or c) 32-bits across only the lower AD[31:0] bus, respectively.

During a normal 64-bit data-width PCI transaction, when REQ64# is detected by the target, the target will assert ACK64# if the combination of the upper AD[63:32] and C/BE[7:4] buses, and PAR64 (hereinafter upper PCI bus); and the lower AD[31:0] and C/BE[3:0] buses, and PAR (hereinafter lower PCI bus) have no detected parity errors during the address phase; and a downshift or swap bit in a control register of the target has not been set so that only the lower PCI bus or the upper PCI bus, respectively, may be used for data transfers. Downshifting herein means that only the lower PCI bus is used for the PCI data transaction. Swapping herein means that only the upper PCI bus is used for the PCI data transaction.

Downshifting may occur when the target detects a parity error on the combination of the upper 32-bit address/data AD[63:32] bus, controlbyte enable C/BE[7:4] bus and PAR64 (upper PCI bus) during the address phase, or when a 64-Bit Disable bit in the target's command register is set. The 64-Bit Disable bit in the target's command register may have been set during a previous write transaction to the target in which the target determined that the upper PCI bus had a parity error. The parity error on the upper PCI bus may have been caused by a faulty signal line in the upper PCI bus, a faulty receiver in the target, or a faulty driver in the initiator. The 64-Bit Disable bit in the target's command register may also have been set during a "built-in-self-test" (BIST) during startup or diagnostic testing of components in the computer system.

Swapping may occur when the target detects a parity error on the combination of the lower 32-bit address/data AD[31:0] bus, control/byte enable C/BE[3:0] bus and PAR during the address phase, or when a Swap Enabled bit in the target's command register is set. The Swap Enabled bit in the target's command register may have been set during a previous write transaction to the target in which the target determined that the lower PCI bus had a parity error. The parity error on the lower PCI bus may have been caused by a faulty signal line in the lower PCI bus, a faulty receiver in the target, or a faulty driver in the initiator. The Swap Enabled bit in the target's command register may also have been set during a "built-in-self-test" (BIST) during startup or diagnostic testing of the computer system.

The present invention utilizes the PCI transaction address phase to determine whether the data phase transaction will properly function across 64-bits (normal), 32-bits on the lower AD[31:0] bus, or 32-bits on the upper AD[63:32] bus. The target may insert wait states into the transaction for enough clocks (time delay) to determine whether there is a parity error on either or both of the upper and lower PCI buses during the address phase. If an address phase parity error on the upper PCI bus is determined, the target will not assert ACK64# and SWAP_ACK#, and the data phase transaction will occur only on the lower PCI bus. If an address phase parity error on the lower PCI bus is determined, the target will assert SWAP_ACK# but not ACK64#, and the data phase transaction will occur only on the upper PCI bus. If address phase parity errors are determined on both the upper and lower PCI buses during the address phase, the target may assert SERR# according to the PCI Specification. Thus the present invention may dynamically determine whether a 64-bit, 32-bit lower PCI bus, or 32-bit upper PCI bus data phase transaction may occur without having to terminate or abort the current bus transaction due to detection of a parity error during the data phase. The address asserted by the initiator on either the lower or upper PCI bus without a parity error will be used by the target for the current transaction. If there is no parity error during the address phase, the address on either the lower PCI bus or the upper PCI bus may be used. It is also contemplated herein that the correct addresses (proper parity) on both the upper and lower PCI buses may be compared for a match so as to increase security and reliability of the computer system.

It is contemplated and within the scope of the present invention to terminate a PCI transaction when a parity error is detected during the data phase thereof. A write transaction having a parity error may be terminated by the target as follows: 1) The target signals "Retry" by asserting STOP# and not asserting TRDY# on the initial data phase of the transaction. 2) "Disconnect" with data may be signaled during any portion of the data phase by the target asserting TRDY# and STOP# together. 3) "Target-Abort" may be signaled by the target deasserting DEVSEL# and asserting STOP# at the same time. These are all standard terminations defined more fully in the PCI Specification incorporated by reference hereinabove. When the target terminates the transaction having a parity error, it may also set the appropriate bit(s) in its command and/or status registers so that when the next transaction occurs, i.e., on a Retry, the target can respond by either not asserting the ACK64# and SWAP_ACK# (lower PCI bus transfer only), or by just asserting the SWAP_ACKA (upper PCI bus transfer only).

In a similar fashion, during a data phase read transaction, the initiator determines whether a data parity error exists on the upper or lower PCI buses. Upon detecting a data parity error, the initiator may set an appropriate bit(s) in its command and/or status registers, and terminate the read transaction. Upon a retry of the read transaction, the initiator may not assert REQ64# and SWAP# if the data parity error was found on the upper PCI bus. If the data parity error was found on the lower PCI bus, then the initiator asserts SWAP# but not REQ64#. The target then responds accordingly by asserting only DEVSEL# for a lower PCI bus transaction, or DEVSEL# and SWAP_ACK# for an upper PCI bus transaction.

The aforementioned examples contemplate PCI bus data transfer behavior modification of the PCI agent that determines the parity error on either the upper or lower PCI buses. During a write transaction the target receives information during both the address and data phases and determines any parity errors thereof. During a read transaction the target only determines a parity error of the address phase, whereas the initiator determines a parity error during the data phase, i.e., data being sent by the target to the initiator. It is contemplated and within the spirit and scope of the present invention that PCI bus data transfer behavior modification may be performed on either or both the receiving and/or transmitting PCI agents. The cause of the parity error may be from a defective signal line receiver, driver, or bus connection. The software device driver for the PCI device(s) and/or operating system software PCI may attempt a retry of the transaction when a parity error has been reported by the PCI device.

Statistical analysis may also be performed by computer system software based on the parity error information reported to the software device drivers and operating system software so that a failure report may be generated which indicates PCI device and bus abnormalities. This may allow a technician to be alerted so that the computer system may be tested and/or serviced before a catastrophic failure occurs. This feature of the present invention is especially advantageous with hot-pluggable PCI device cards which may be substituted and/or replaced without turning off the computer system.

An advantage of the present invention is that a fault causing a parity error on either the upper or lower PCI buses will not cause a computer system shutdown.

Another advantage is that either the upper or lower PCI buses may be dynamically configured for error free data transfer if one of the two buses has a parity error during an address phase of the PCI transaction.

A feature of the present invention to retry a PCI transaction when a parity error is detected.

Another feature of the present invention is that an error reporting system may be utilized to alert a technician before there is a catastrophic failure of the computer system.

Another feature is identifying a defective PCI device card and, if the PCI device card is hot pluggable, replacing the defective PCI device card without having to shut down the computer.

Other and further features and advantages will be apparent from the following description of presently preferred embodiments of the invention, given for the purpose of disclosure and taken in conjunction with the accompanying drawings.

BRIEF DESCRIPTION OF THE DRAWINGS

FIG. 4 is a schematic diagram of a PCI device configuration space header;

DETAILED DESCRIPTION OF THE PREFERRED EMBODIMENTS

Figure 1:
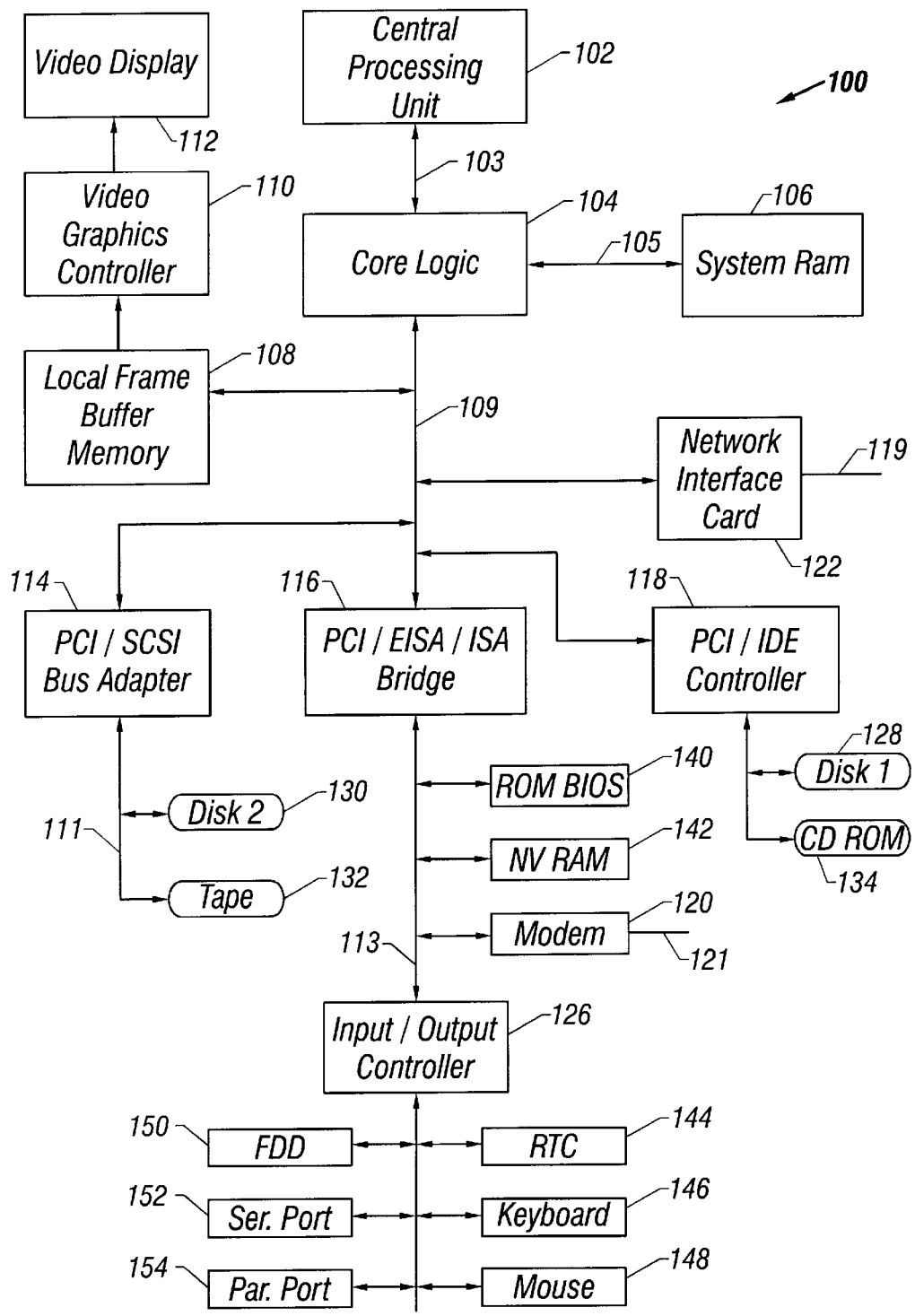
FIG. 1 is a schematic block diagram of a computer system.

The present invention is an apparatus, method and system for improving fault tolerance on a 64-bit data-width PCI bus when either the upper or lower 32-bit data-width portions of the 64-bit data-width PCI bus may have an unrecoverable operating fault. The present invention provides in a computer system a fault tolerant 64-bit data-width PCI bus system that may recover from any fault occurring on either the upper or lower portions of the 64-bit data width PCI bus.

The PCI bus was developed to have sufficient data bandwidth for high performance peripherals such as a video controller, a high speed network interface card(s), a hard disk controller(s), a SCSI adapter, a wide area network digital router, and the like. A PCI bus may have a plurality of card connectors attached thereto, or PCI devices may be embedded on the computer system printed circuit motherboard. Sophisticated graphics and increased network data transfer requirements have put upward pressure on the PCI buses for faster data transfers between the computer system main memory, host processor(s), and peripherals. Thus, a 64 bit PCI bus(es) is desirable, however, introducing more data paths increases the likelihood that a data error(s) may occur.

For illustrative purposes, the preferred embodiments of the present invention are described hereinafter for computer systems utilizing the Intel x86 microprocessor architecture and certain terms and references will be specific to that processor platform. PCI is an interface standard, however, that is hardware independent and may be utilized with any host computer designed for this interface standard. It will be appreciated by those skilled in the art of computer systems that the present invention may be adapted and applied to any computer platform utilizing the PCI interface standard. The PCI specifications referenced above are readily available and are hereby incorporated by reference.

Referring now to the drawings, the details of preferred embodiments of the present invention are schematically illustrated. Like elements in the drawings will be represented by like numbers, and similar elements will be represented by like numbers with a different lower case letter suffix.

Referring to FIG. 1, a schematic block diagram of a computer system according to the present invention is illustrated. The computer system is generally indicated by the numeral 100 and comprises a central processing unit(s) ("CPU") 102, core logic 104, system random access memory ("RAM") 106, a video graphics controller 110, a local frame buffer 108, a video display 112, a PCI/SCSI bus adapter 114, a PCI/EISA/ISA bridge 116, a PCI/IDE controller 118, and, optionally, a network interface card ("NIC") 122. Single or multilevel cache memory (not illustrated) may also be included in the computer system 100 according to the current art of microprocessor computer systems. The CPU 102 may be a plurality of CPUs 102 in a symmetric or asymmetric multiprocessor configuration.

The CPU(s) 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a PCI bus 109. More than one PCI bus is contemplate herein as well as PCI-to-PCI bridges (not illustrated), and is within the scope and intent of the present invention. The local frame buffer 108 is connected between the video graphics controller 110 and the PCI bus 109. The PCV/SCSI bus adapter 114, PCI/EISA/ISA bridge 116, PCI/IDE controller 118 and the NIC 122 are connected to the PCI bus 109. Some of the PCI devices such as the Video controller 110 and NIC 122 may plug into PCI connectors on the computer system 100 motherboard (FIG. 2).

Hard disk 130 and tape drive 132 are connected to the PCI/SCSI bus adapter 114 through a SCSI bus 111. The NIC 122 may be connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, serial port 152, and parallel port 154. The EISA/ISA bus 113 is a slower information bus than the PCI bus 109, but it costs less to interface with the EISA/ISA bus 113.

When the computer system 100 is first turned on, start-up information stored in the ROM BIOS 140 is used to begin operation thereof Basic setup instructions are stored in the ROM BIOS 140 so that the computer system 100 can load more complex operating system software from a memory storage device such as the disk 130. Before the operating system software can be loaded, however, certain hardware in the computer system 100 must be configured to properly transfer information from the disk 130 to the CPU 102. In the computer system 100 illustrated in FIG. 1, the PCI/SCSI bus adapter 114 must be configured to respond to commands from the CPU 102 over the PCI bus 109 and transfer information from the disk 130 to the CPU 102 via buses 109 and 103. The PCI/SCSI bus adapter 114 is a PCI device and remains platform independent. Therefore, separate hardware independent commands are used to setup and control any PCI device in the computer system 100. These hardware independent commands, however, are located in a PCI BIOS contained in the computer system ROM BIOS 140. The PCI BIOS is firmware that is hardware specific but meets the general PCI specification. Plug and play, and PCI devices in the computer system are detected and configured when a system configuration program is executed. The results of the plug and play, and PCI device configurations are stored in the NVRAM 142 for later use by the startup programs in the ROM BIOS 140 and PCI BIOS which configure the necessary computer system 100 devices during startup. Also during startup a "built-in-self-test" (BIST) may do diagnostic testing of components, such as PCI devices, in the computer system.

Figure 2:
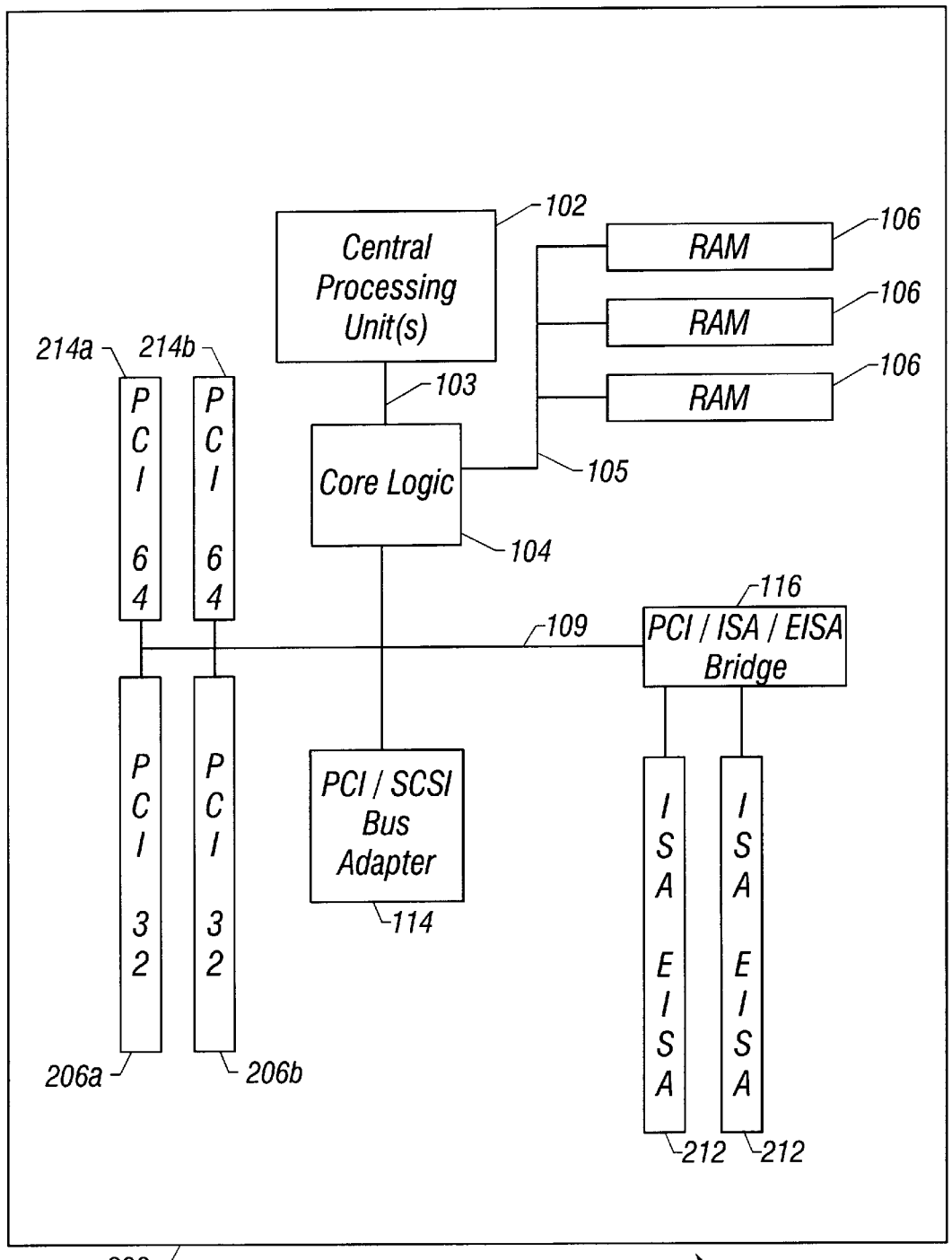
FIG. 2 is a schematic diagram in plan view of a printed circuit motherboard of the computer system of FIG. 1.

Referring now to FIG. 2, a schematic diagram of a computer system motherboard according to FIG. 1 is illustrated in plan view. The computer system motherboard 200 comprises printed circuit board 202, on which components and connectors are mounted thereto. The printed circuit board 202 comprises conductive printed wiring which is used to interconnect the components and connectors thereon. The conductive printed wiring (illustrated as buses 103, 105 and 109) may be arranged into signal buses having controlled impedance characteristics. Illustrated on the printed circuit board are the core logic 104, CPU(s) 102, RAM 106, embedded PCI/ISA/EISA bridge 116, ISA/EISA connectors 312, embedded PCI/SCSI bus adapter 114, 32-bit PCI connectors 206a, 206b and 64-bit PCI connectors 214a, 214b. The connectors 214a, 214b carry the additional signals required for 64-bit data-width PCI operation. The motherboard 200 may be assembled into a case with a power supply, disk drives, etc., (not illustrated) which comprise the computer system 100 of FIG. 1.

Figure 3:
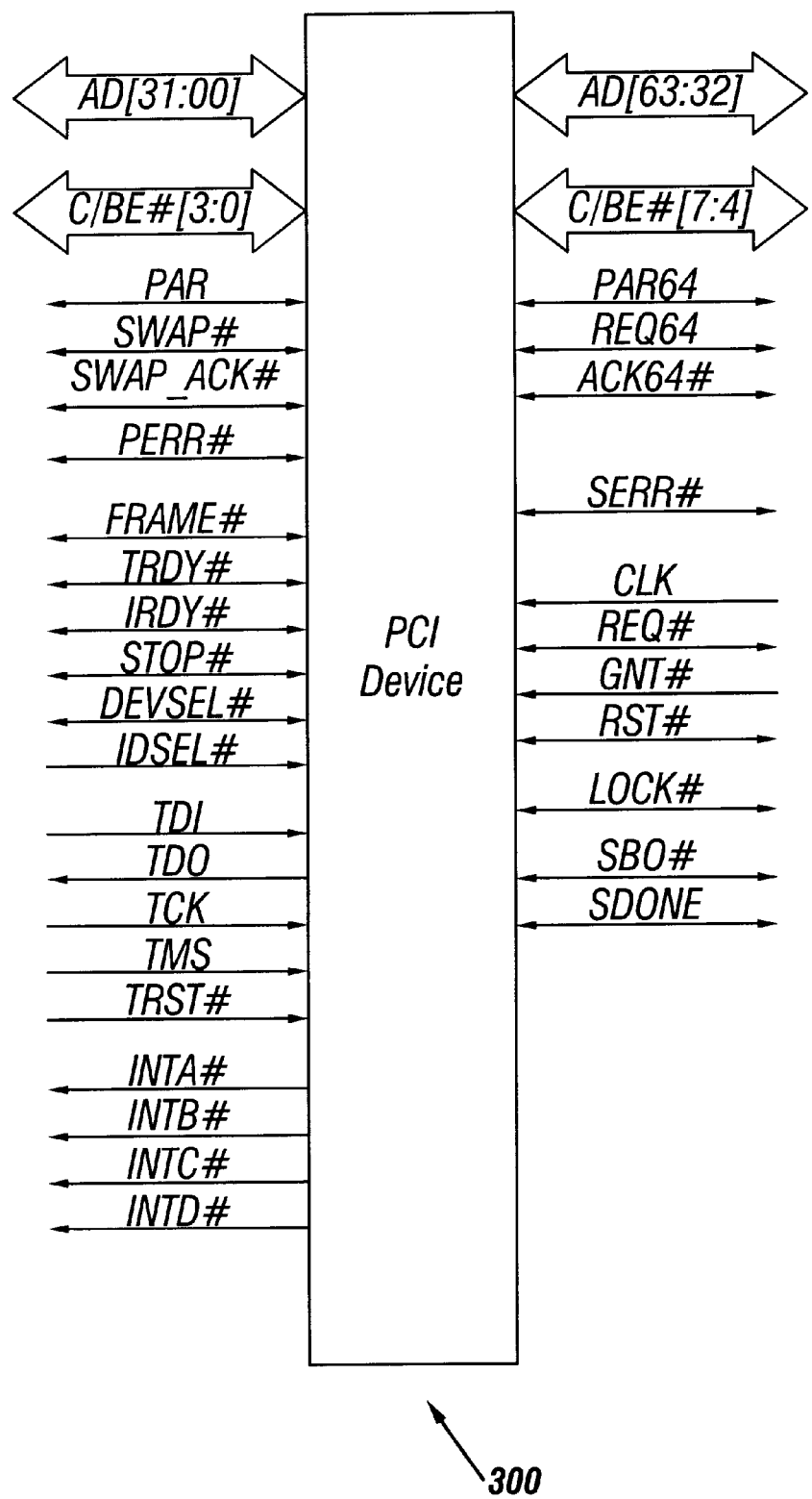
FIG. 3 is a schematic block diagram of signals to and from a PCI device, according to the present invention.

Referring now to FIG. 3, a schematic block diagram of signals to and from a PCI device, according to an embodiment of the present invention, is illustrated. The PCI device is generally represented by the numeral 300. The signals indicated for the PCI device 300 are more fully defined in the PCI Specification except for new signals SWAP# and SWAP_ACK#. The signal SWAP# herein indicates that the initiator is either requesting that a data transaction be over the upper PCI bus only, or that the initiator is capable of transferring data over just the upper PCI bus.

When both SWAP# and REQ64# are asserted by the PCI bus initiator, the response from the target determines whether the data phase transaction will be over the entire 64-bit data-width upper and lower PCI buses (ACK64# asserted but not SWAP_ACK#), the lower PCI bus (neither ACK64# nor SWAP_ACK# asserted), or the upper PCI bus (SWAP_ACK# asserted but not ACK64#). When SWAP# is asserted but not REQ64# is asserted, the initiator is requesting an upper PCI bus data phase transfer only. When neither SWAP# nor REQ64# is asserted, the initiator is requesting a lower PCI bus data phase transfer only. The target will indicate how it will effect a data phase transfer by asserting just DEVSEL# for a lower PCI bus data phase transfer only, DEVSEL# and ACK64# for a 64-bit data-width data phase transfer, or DEVSEL# and SWAP_ACK# for an upper PCI bus data phase transfer only.

Referring now to FIG. 4, a schematic diagram of a PCI device configuration space header is illustrated. The PCI device configuration space header is generally represented by the numeral 400. The PCI device configuration space header 400 depicts the layout of a Type 00h predefined portion of a 256-byte Configuration Space of the PCI device 300. The register fields in the configuration space header 400 are more fully defined in the PCI Specification. The present invention may utilize additional bits in the Command register 402 and Status register 404 (offset addresses 04h and 06h, respectively). PCI device drivers and other computer system software may read and/or write to the Command register 402 and Status register 404 for determining the status of a prior action (read a register), or controlling a future action (write to a register).

Figure 5:
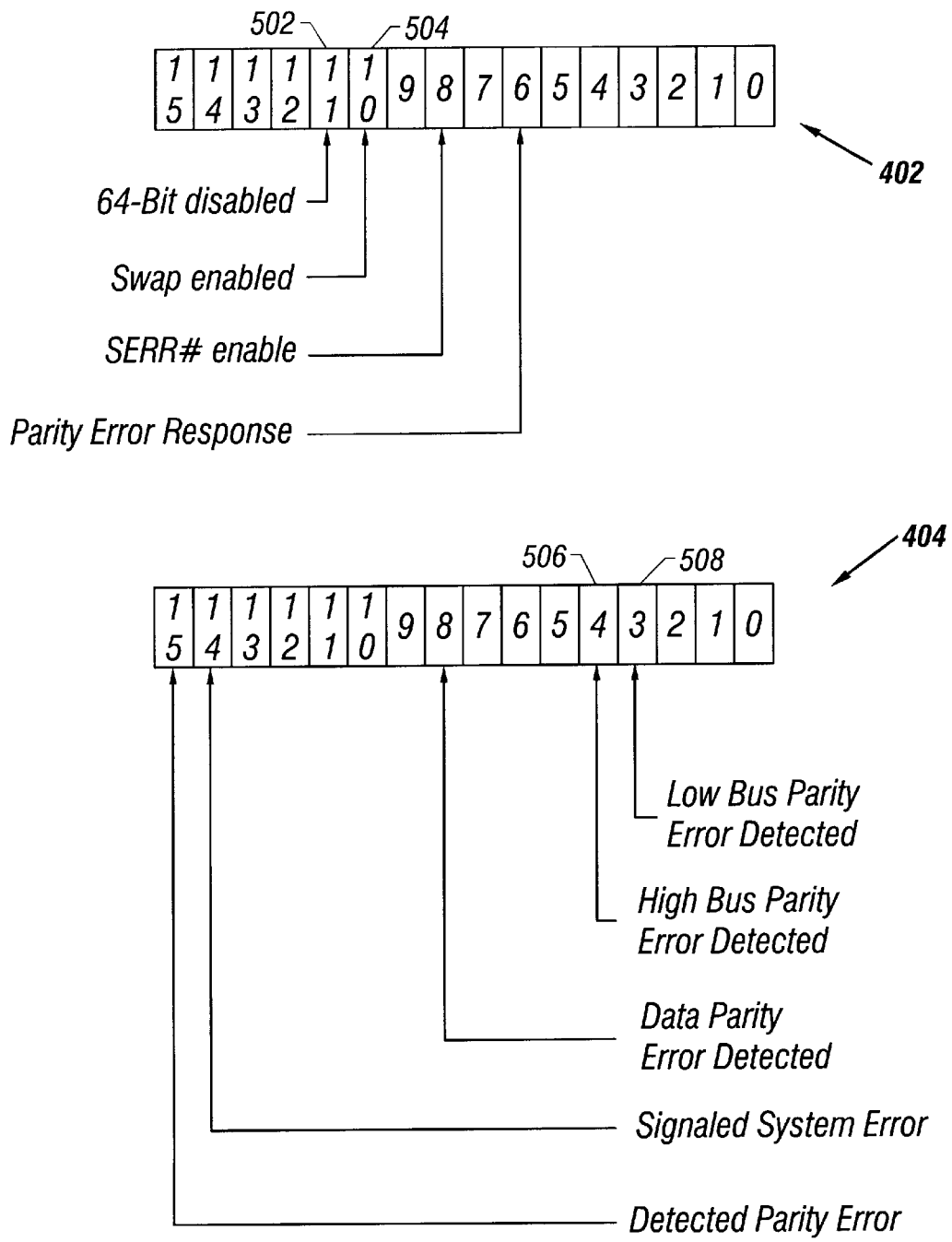
FIG. 5 is a schematic diagram of command and status registers of the configuration space header of FIG. 4.

Referring to FIG. 5, schematic diagrams of the command register 402 and the status register 404 are illustrated. The command register 402 comprises 16 bits, some predefined by the PCI specification, the others reserved for future use. The present invention may utilize two of these reserved bits as a 64-bit disabled bit, represented by the numeral 502, and Swap enabled bit, represented by the numeral 504. For example, the 64-bit disabled bit 502 may be set or cleared by the PCI device software driver so that when the PCI device is an initiator during a PCI transaction, it will attempt to transact with a target over either a 64-bit data-width (bit 502 cleared) or a 32-bit data-width (bit 502 set)(i.e., REQ64# will be asserted or not asserted). The Swap enabled bit 504 may be set or cleared by the PCI device software driver so that when the PCI device is an initiator during a PCI transaction, it may transact with a target over the upper 32-bit data-width PCI bus when bit 504 is set (i.e., SWAP# will be asserted or not asserted).

The 64-bit disabled bit 502 may also be set or cleared by the PCI device software driver so that when the PCI device is a target during a PCI transaction, it will acknowledge a transaction with the initiator over either a 64-bit data-width (bit 502 cleared) or a 32-bit data-width (bit 502 set)(i.e., ACK64# will be asserted or not asserted, respectively). The Swap enabled bit 504 may also be set or cleared by the PCI device software driver so that when the PCI device is the target during a PCI transaction, it may transact with the initiator over only the upper 32-bit data-width PCI bus when bit 504 is set (i.e., SWAP_ACK# will be asserted or not asserted, and ACK64# will not be asserted).

The status register 404 comprises 16 bits, some predefined by the PCI specification, the others reserved for future use. The present invention may utilize two of these reserved bits as a High Bus Parity Error Detected bit, represented by the numeral 506, and a Low Bus Parity Error Detected bit, represented by the numeral 508. The High Bus Parity Error Detected bit 506 indicates that a parity error was detected on the upper PCI bus. Likewise, the Low Bus Parity Error Detected bit 508 indicates that a parity error was detected on the lower PCI bus. These status bits are available for reading by the PCI device software drivers, and the information represented therein may be used by the computer system operating software. These status bits may also be used by the PCI device logic to inhibit a 64-bit data-width transaction and either utilize the lower PCI bus or the upper PCI bus for a 32-bit data-with transaction. It is contemplated herein that many different combinations of command and status bits may be utilized with the present invention.

Figure 6A:
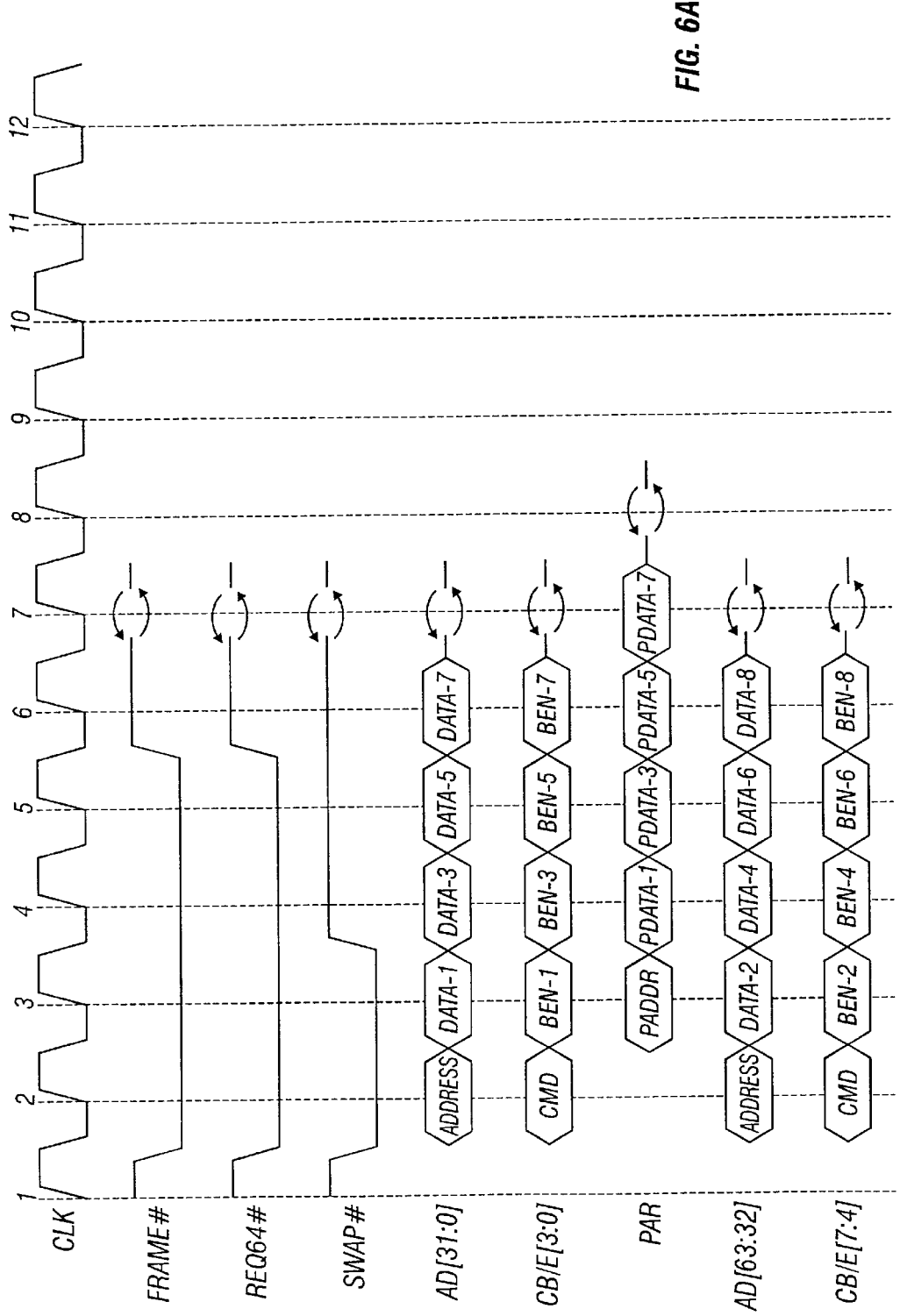
FIGS. 6–12 are schematic timing diagrams of various PCI bus operations, according to the present invention.

Referring now to FIG. 6, a schematic timing diagram of a normal 64-bit data-width write transaction is illustrated, according to the present invention. Assume that a PCI initiator has arbitrated for and obtained (owns) the PCI bus (not illustrated), now during PCI clock 1 (CLK1), FRAME#, REQ64#, and SWAP# are asserted by the PCI initiator. There are no predisposed restrictions set in the PCI initiator or PCI target (i.e., 64-Bit disabled bit 502 or Swap enabled bit 504 are not set). Also during CLK 1 the transaction address is asserted on both the AD[31:0] and AD[63:32] buses, and the transaction command is asserted on both the CB/E[3:0] and CB/E[7:0] buses. Applying the transaction address and command during the address phase of the PCI transaction redundantly to both the lower and upper PCI buses allows the target to determine whether one or both of the PCI buses has a fault by calculating whether there exists a parity error for the transaction address on either or both of the PCI buses, as disclosed more fully below.

Once the target decodes its address, it will assert DEVSEL#, and may assert ACK64# which indicates that a 64-bit data-width transaction during the data phase may proceed. Once IRDY# and TRDY# are asserted, data may be transferred from the initiator to the target during the data phase write transaction. Since SWAP_ACK# was not asserted by the target, the initiator may deassert SWAP# since it serves no further purpose in the instant transaction. The last data transfer is indicated by FRAME# being deasserted.

The initiator calculates values for PAR and PAR64, and asserts them one clock after the respective address or data values, so that an even parity is generated in conjunction with the combination of the AD[31:0] and CB/E[3:0] buses, and the AD[63:32] and CB/E[7:3] buses, respectively. The target uses the number of 1's received on the AD[31:0] bus, CB/E[3:0] bus and PAR to verify that an even parity was received on the lower PCI bus, and the number of 1's received on the AD[63:32] bus, CB/E[7:4] bus and PAR64 to verify that an even parity was received on the upper PCI bus. During the address phase, if the target does not calculate an even parity for both the upper and lower PCI buses, it may assert SERR#. In the example illustrated in FIG. 6, there is no parity error(s) during either the address or data phases of the PCI write transaction.

Figure 7B:
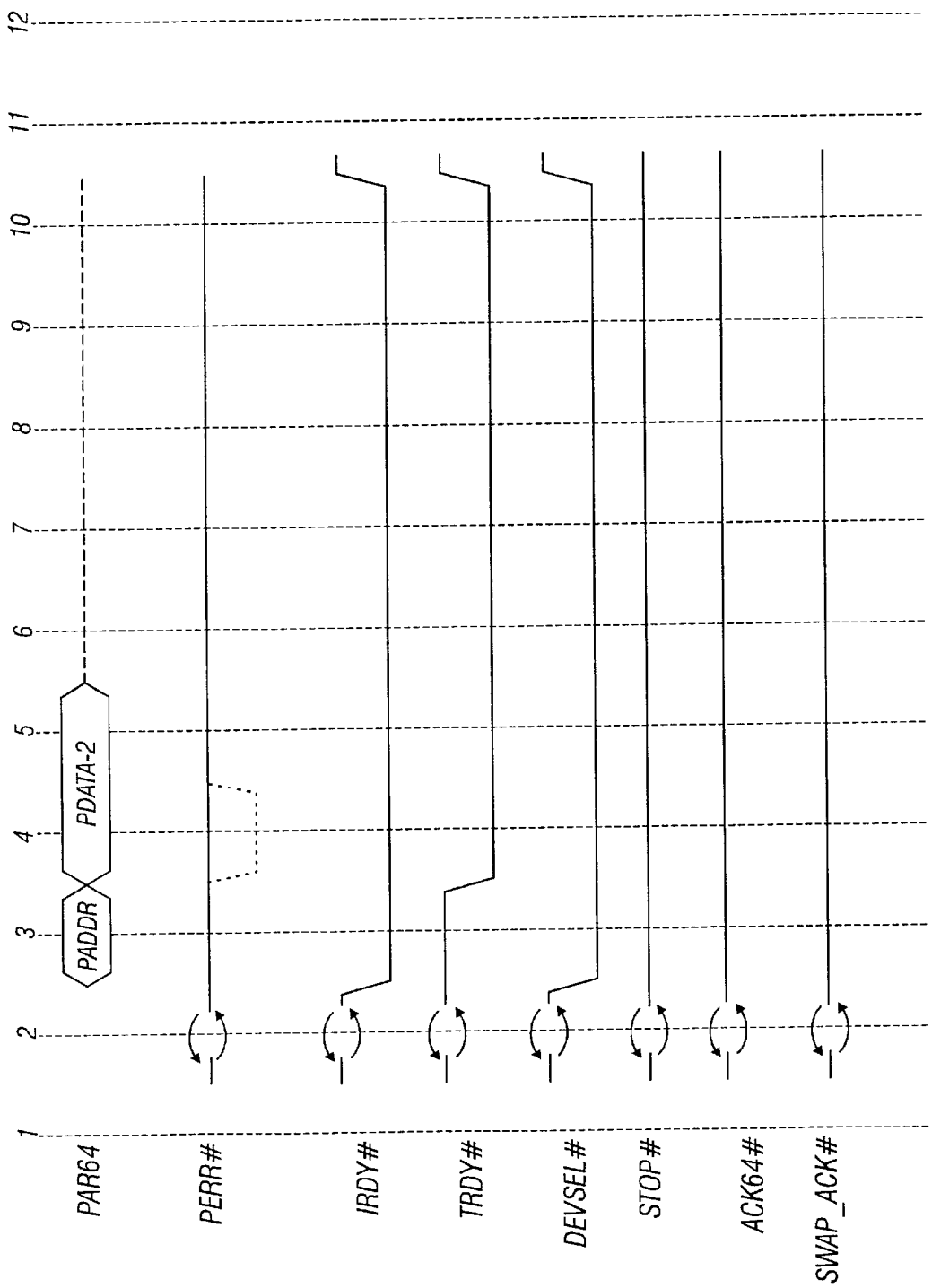

Referring now to FIG. 7, a schematic timing diagram is illustrated of a write transaction having a wait state inserted by the target and an address parity error detected on the upper PCI bus. The transaction illustrated in FIG. 7 begins as described above for the transaction illustrated in FIG. 6. The target, however, inserts a wait state by not asserting TRDY# until after CLK 2 so that the target may determine whether a parity error exists on one or both of the upper and lower PCI buses during the address phase. A parity error on the lower PCI bus is based on an incorrect number of 1s on the combination of the AD[31:0] bus, CB/E[3:0] bus, and PAR. A parity error on the upper PCI bus is based on an incorrect number of 1s on the combination of the AD[63:32] bus, CB/E[7:4] bus, and PAR64.

For the example illustrated in FIG. 7, an address parity error on the upper PCI bus is assumed. The target may use the address parity error information to control its transaction setup response to the initiator. Since the address parity error was on the upper PCI bus, the target neither asserts ACK64# nor SWAP_ACK# (64-Bit disabled bit 502 may also be set), and asserts TRDY# at CLK 4. This tells the initiator to transfer data on the lower PCI bus only. If no data phase parity error(s) is detected by the target on the lower PCI bus, then the write transaction proceeds to completion. The present invention, thus, dynamically configures the functional data path for the write transaction without having to request a Retry or Abort. The present invention may also issue a Retry or Abort, and the 64-Bit disabled bit 502 may be set in the target. Then when the initiator starts a new transaction with this target, neither ACK64# nor SWAP_ACK# will be asserted by the target (the 64-bit disabled bit 502 was previously set).

Since neither ACK64# nor SWAP_ACK# were asserted by the target when TRDY# is asserted, the initiator transfers data only on the lower PCI bus. The data initially asserted by the initiator on the upper PCI bus (data-2) is repeated on the lower PCI bus during CLK 5. The last data transfer is indicated by FRAME# being deasserted at CLK 9. REQ64# and SWAP# are deasserted after CLK 4 by the initiator once it has been determined that data transfers will occur over only the lower PCI bus.

Figure 8A:
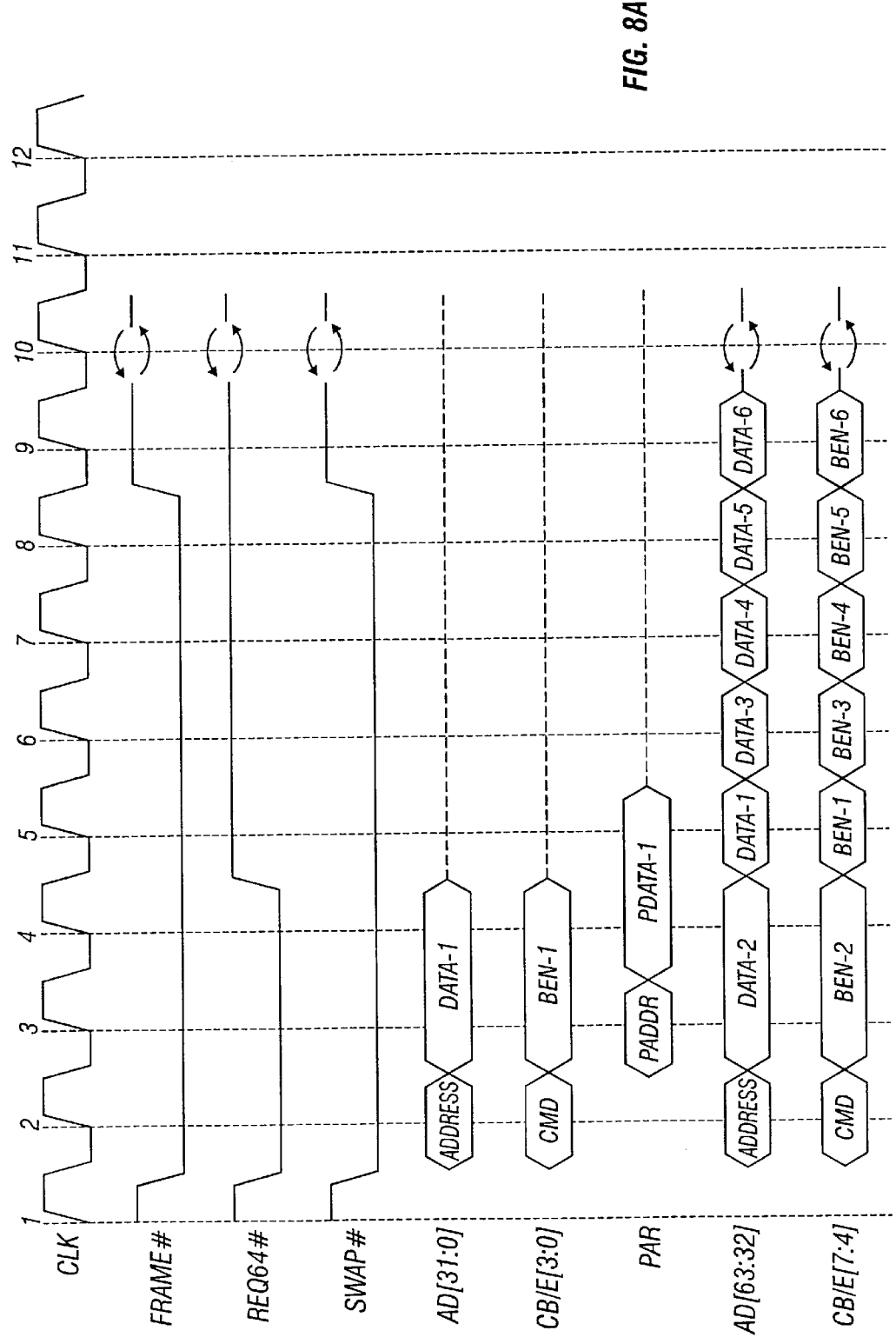
Figure 8B:
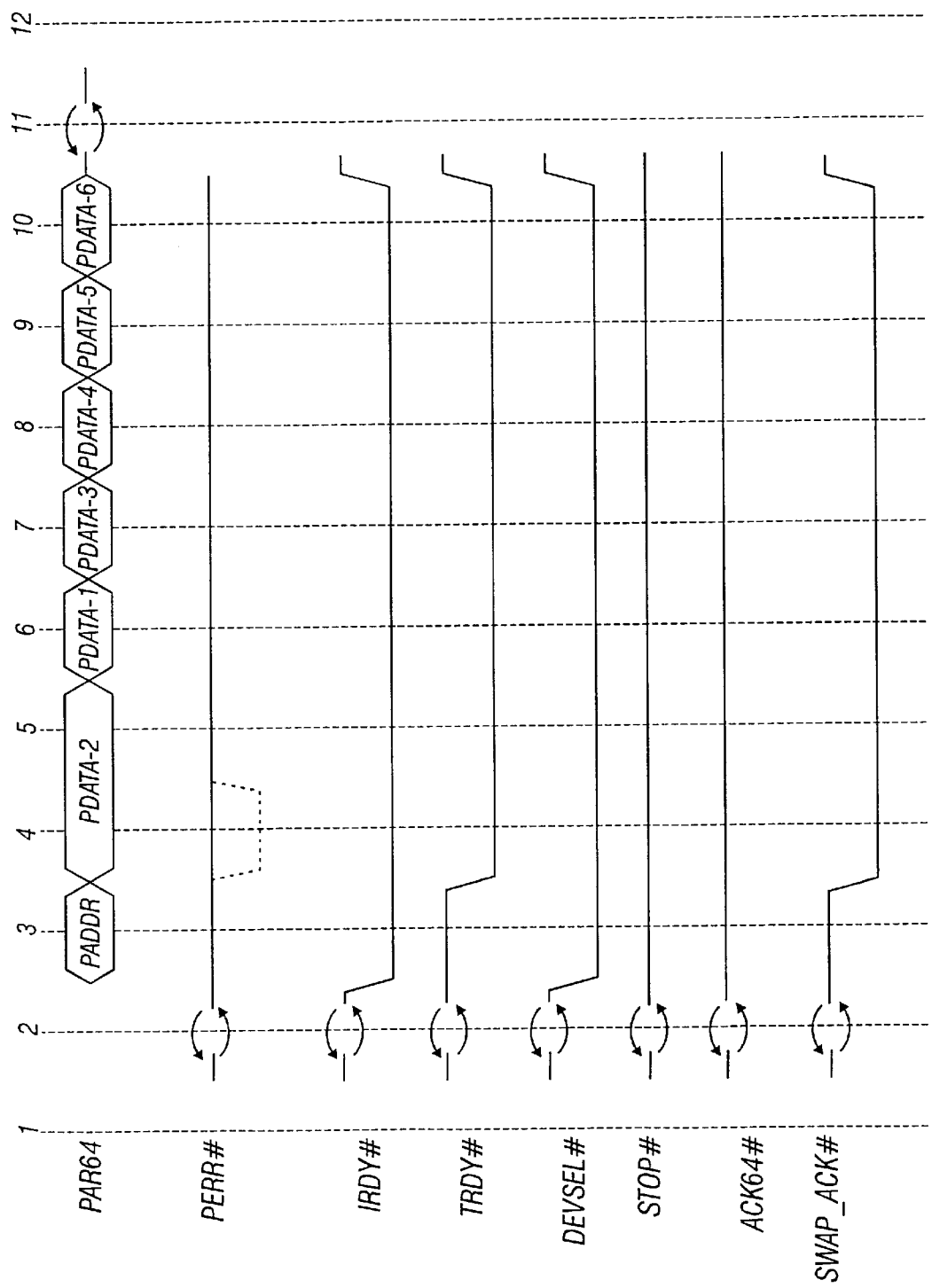

Referring now to FIG. 8, a schematic timing diagram is illustrated of a write transaction having a wait state inserted by the target and an address parity error detected on the lower PCI bus. The transaction illustrated in FIG. 8 begins as described above for the transaction illustrated in FIG. 6. The target, however, inserts a wait state by not asserting TRDY# until after CLK 2 so that the target may determine whether a parity error exists on one or both of the upper and lower PCI buses during the address phase. A parity error on the lower PCI bus is based on an incorrect number of 1s on the combination of the AD[31:0] bus, CB/E[3:0] bus, and PAR. A parity error on the upper PCI bus is based on an incorrect number of 1s on the combination of the AD[63:32] bus, CB/E[7:4] bus, and PAR64.

For the example illustrated in FIG. 8, an address parity error on the lower PCI bus is assumed. The target may use the address parity error information to control its transaction setup response to the initiator. Since the address parity error was on the lower PCI bus, the target asserts SWAP_ACK# but not ACK64# (Swap enabled bit 504 may also be set), and asserts TRDY# at CLK 4. This tells the initiator to transfer data on the upper PCI bus only. If no data parity error(s) is detected by the target on the upper PCI bus, then the write transaction proceeds to completion. The present invention, thus, dynamically configures the functional data path for the write transaction without having to request a Retry or Abort. The present invention may also issue a Retry or Abort after setting the 64-Bit disabled bit 502 and/or Swap enabled bit 504 in the target. Then when the initiator starts a new transaction with this target, SWAP_ACK# will be asserted but not ACK64# (the Swap enabled bit 504 was previously set).

Since SWAP ACK# was asserted (ACK64# deasserted) by the target when TRDY# is asserted, the initiator transfers data only on the upper PCI bus. The data initially asserted by the initiator on the lower PCI bus (data-1) is repeated on the upper PCI bus during CLK 5. The last data transfer is indicated by FRAME# being deasserted at CLK 9. REQ64# is deasserted after CLK 4 by the initiator once it has been determined that data transfers will occur over only the upper PCI bus. Thus, the present invention adds only one wait state (one clock time) when determining if an address parity error exists and then dynamically configures the functional data path for the data phase write transaction.

Figure 9A:
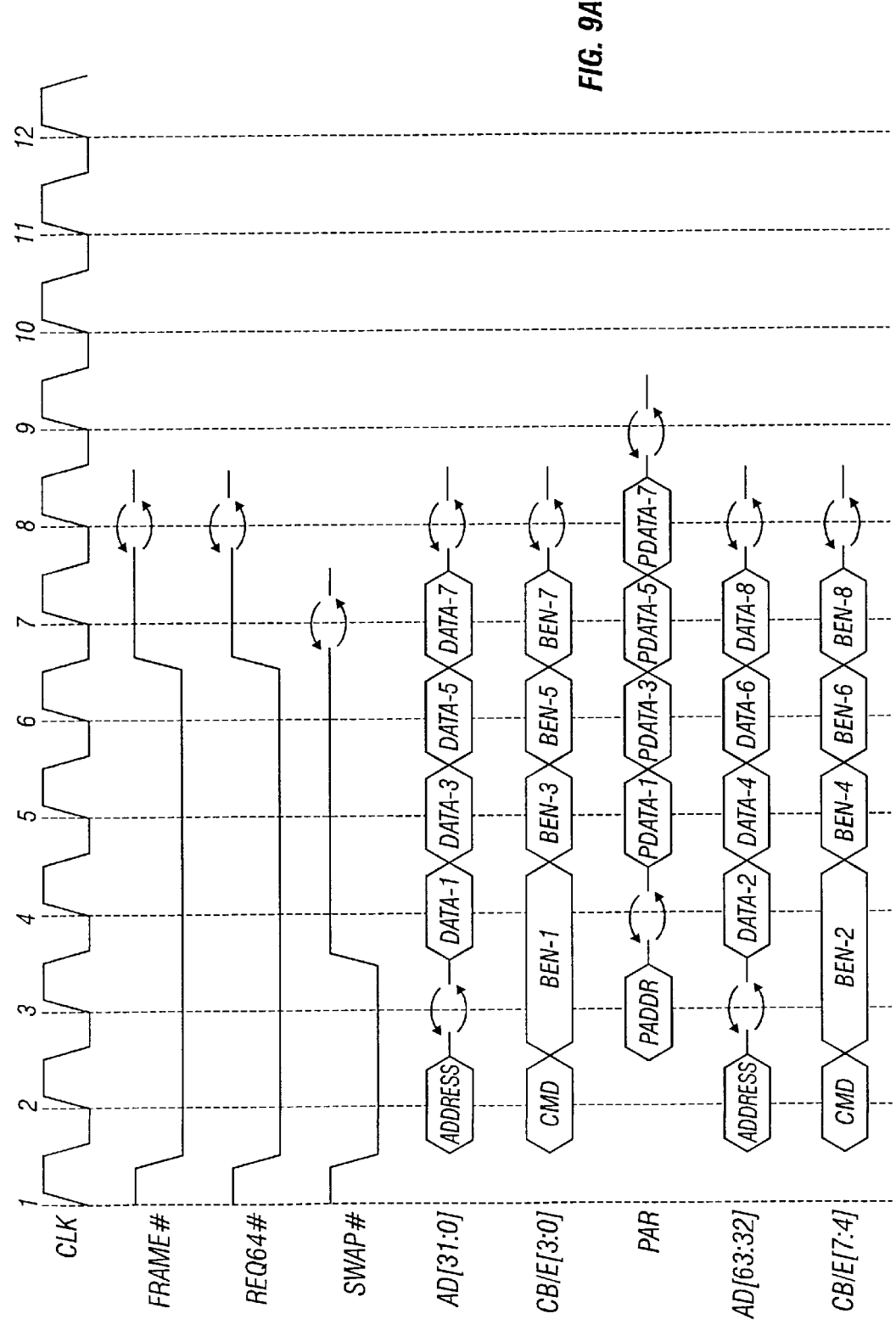

Referring now to FIG. 9, a schematic timing diagram of a normal 64-bit data-width read transaction is illustrated, according to the present invention. Assume that a PCI initiator has arbitrated for and obtained (owns) the PCI bus (not illustrated), now during PCI clock 1 (CLK1), FRAME#, REQ64#, and SWAP# are asserted by the PCI initiator. There are no predisposed restrictions set in the PCI initiator or PCI target (i.e., 64-Bit disabled bit 502 or Swap enabled bit 504 are not set). Also during CLK 1, the transaction address is asserted on both the AD[31:0] and AD[63:32] buses, and the transaction command is asserted on both the CB/E[3:0] and CB/E[7:0] buses. Applying the transaction address and command during the address phase of the PCI transaction redundantly to both the lower and upper PCI buses allows the target to determine whether one or both of the PCI buses has a fault by calculating whether there exists a parity error for the transaction address on either or both of the PCI buses, as disclosed above for the example illustrated in FIG. 6. If a parity error exists on both of the PCI buses during the address phase, SERR# may be asserted according to the PCI Specification.

Once the target decodes its address, it will assert DEVSEL# and may assert ACK64# which indicates that a 64-bit data-width transaction during the data phase may proceed. Once IRDY# and TRDY# are asserted, data may be transferred from the target to the initiator during the data phase read transaction. Since SWAP_ACK# was not asserted by the target, the initiator may deassert SWAP# since it serves no further purpose in the instant transaction. The last data transfer is indicated by FRAME# being deasserted.

The initiator calculates values for PAR and PAR64 for the address phase, and the target calculates values for PAR and PAR64 during the data phase. PAR and PAR64 are asserted one clock after their respective address or data values, so that an even parity is generated in conjunction with the combination of the AD[31:0] and CB/E[3:0] buses, and the AD[63:32] and CB/E[7:3] buses, respectively. During the address phase, the target uses the number of 1's received on the AD[31:0] bus, CB/E[3:0] bus and PAR to verify that an even parity was received on the lower PCI bus, and number of 1's received on the AD[63:32] bus, CB/E[7:4] bus and PAR64 to verify that an even parity was received on the upper PCI bus. During the data phase, the initiator uses the number of 1's received on the AD[31:0] bus, CB/E[3:0] bus and PAR to verify that an even parity was received on the lower PCI bus, and number of 1's received on the AD[63:32] bus, CB/E[7:4] bus and PAR64 to verify that an even parity was received on the upper PCI bus. If the initiator does not calculate an even parity for both the upper and lower PCI buses, it will assert PERR#. In the example illustrated in FIG. 9, there is no parity error(s) during either the address or data phases of the PCI read transaction.

Figure 10A:
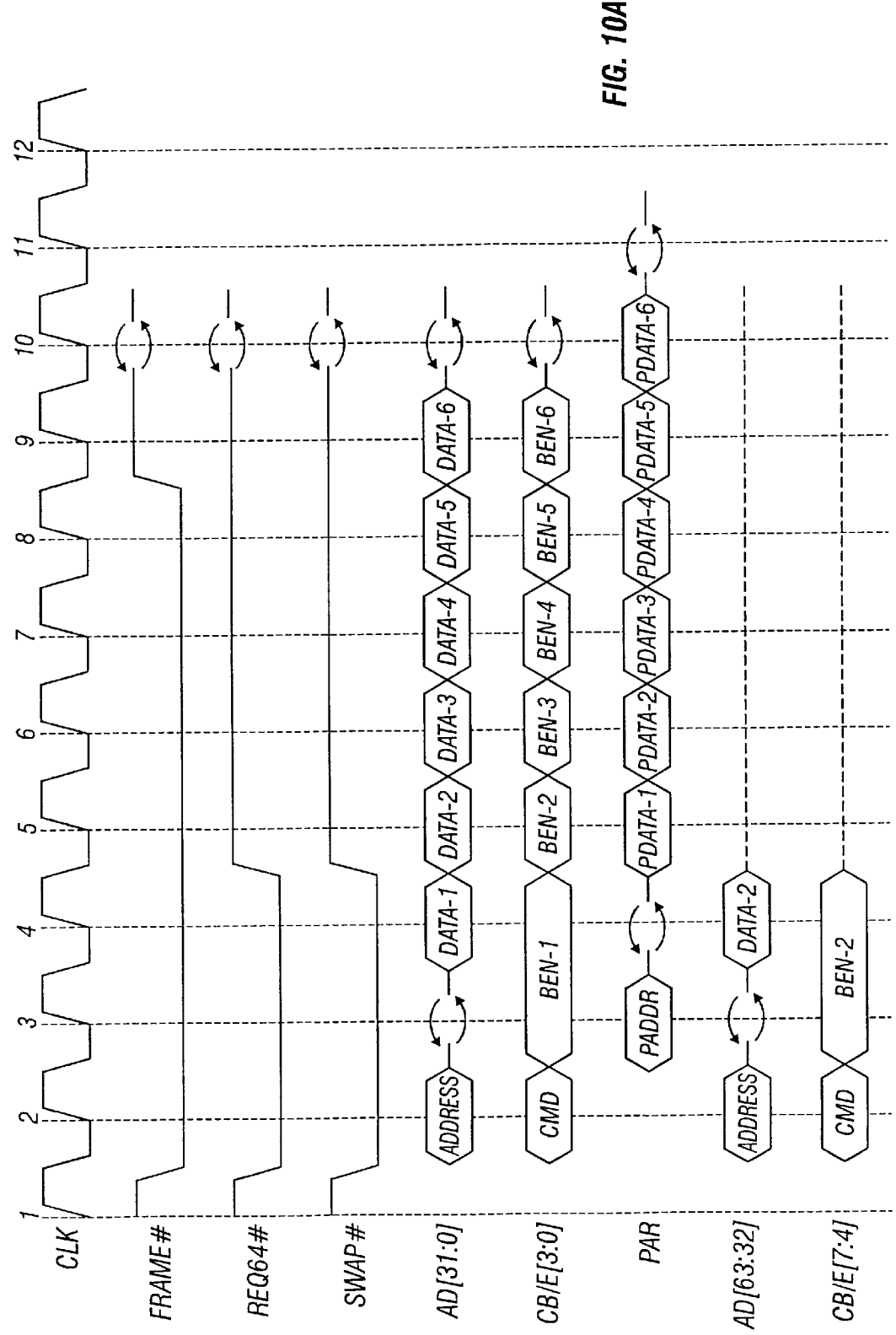
Figure 10B:
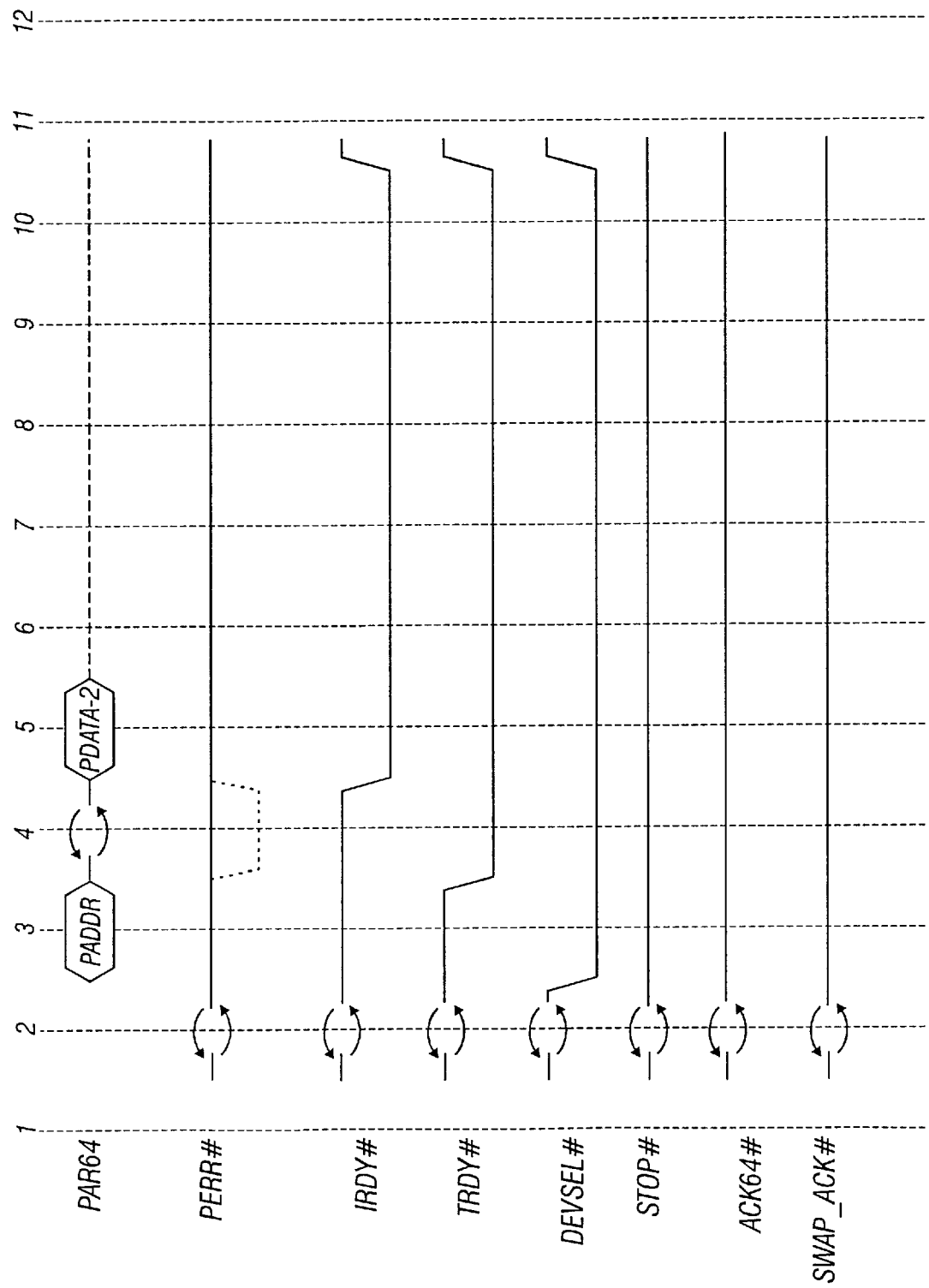

Referring now to FIG. 10, a schematic timing diagram is illustrated of a read transaction having wait a state inserted by the target and an address parity error detected on the upper PCI bus. The transaction illustrated in FIG. 10 begins as described above for the transaction illustrated in FIG. 9. The target, however, inserts a wait state by not asserting TRDY# until after CLK 2 so that the target may determine whether a parity error exists on one or both of the upper and lower PCI buses during the address phase. A parity error on the lower PCI bus is based on an incorrect number of 1s on the combination of the AD[31:0] bus, CB/E[3:0] bus, and PAR. A parity error on the upper PCI bus is based on an incorrect number of 1s on the combination of the AD[63:32] bus, CB/E[7:4] bus, and PAR64.

For the example illustrated in FIG. 10, an address parity error on the upper PCI bus is assumed. The target may use the address parity error information to control its transaction setup response to the initiator. Since the address parity error was on the upper PCI bus, the target asserts neither ACK64# nor SWAP_ACK# (64-Bit disabled bit 502 may also be set), and asserts TRDY# at CLK 4. This tells the initiator that read data will be transferred on the lower PCI bus only. If no data phase parity error(s) is detected by the initiator on the lower PCI bus, then the read transaction proceeds to completion. The present invention, thus, dynamically configures the functional data path for the read transaction without having to request a Retry or Abort. The present invention may also issue a Retry or Abort, and the 64-Bit disabled bit 502 may be set in the target during the address phase, or in the initiator during the data phase. Then when the initiator starts a new transaction with this target, neither ACK64# nor SWAP_ACK# will be asserted by the target (the 64-bit disabled bit 502 was previously set in the target during the address phase), or neither REQ64# nor SWAP# will be asserted by the initiator (the 64-bit disabled bit 502 was previously set in the initiator during the data phase). Since neither ACK64# nor SWAP_ACK# were asserted by the target when TRDY# is asserted, the initiator receives data only on the lower PCI bus. The data initially asserted by the target on the upper PCI bus (data-2) is repeated on the lower PCI bus during CLK 5. The last data transfer is indicated by FRAME# being deasserted at CLK 9. REQ64# and SWAP# are deasserted after CLK 4 by the initiator once it has been determined that data transfers will occur over only the lower PCI bus.

Figure 11A:
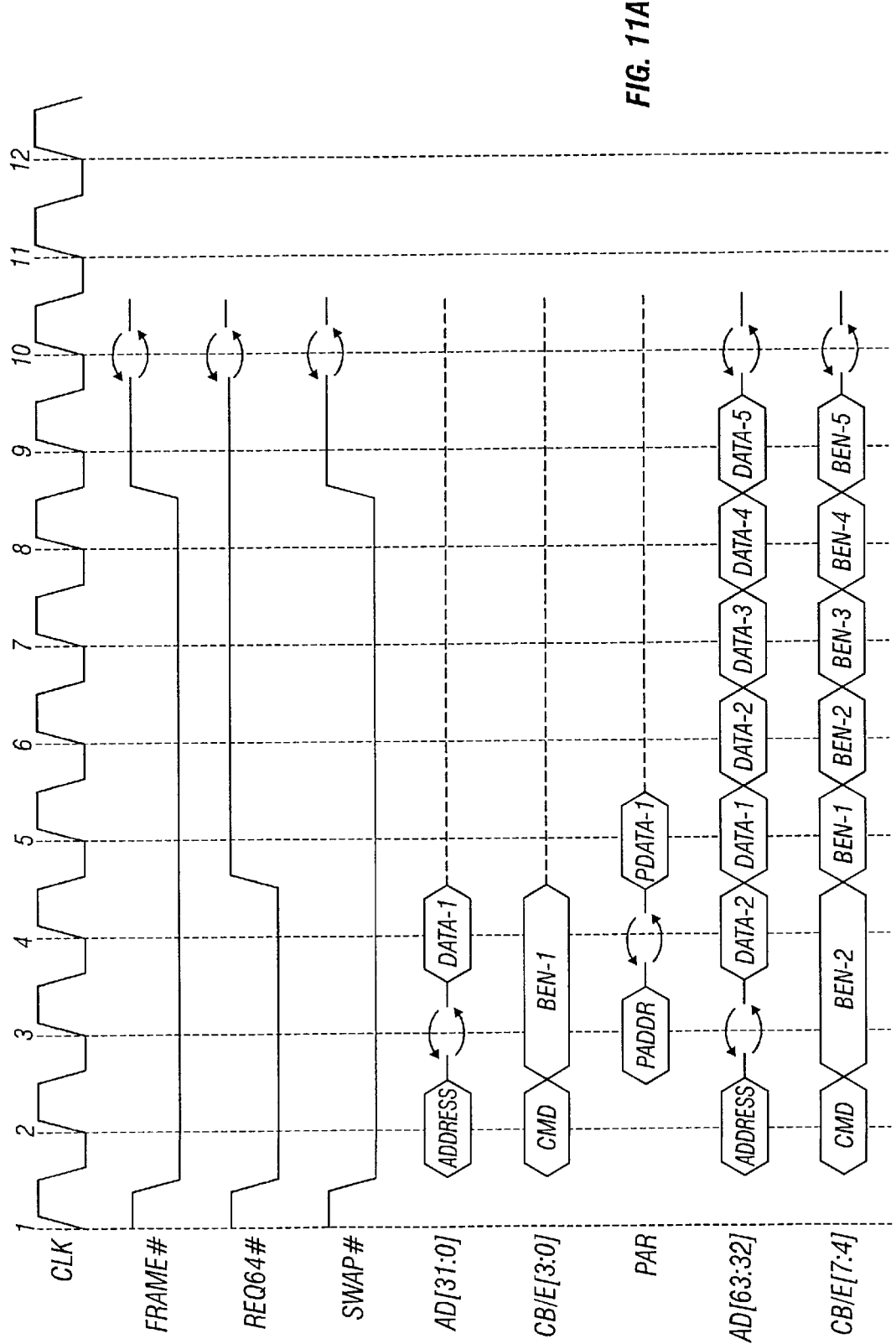

Referring now to FIG. 11, a schematic timing diagram is illustrated of a read transaction having a wait state inserted by the target and an address parity error detected on the lower PCI bus. The transaction illustrated in FIG. 11 begins as described above for the transaction illustrated in FIG. 9. The target, however, inserts a wait state by not asserting TRDY# until after CLK 2 so that the target may determine whether a parity error exists on one or both of the upper and lower PCI buses during the address phase. A parity error on the lower PCI bus is based on an incorrect number of 1s on the combination of the AD[31:0] bus, CB/E[3:0] bus, and PAR. A parity error on the upper PCI bus is based on an incorrect number of 1s on the combination of the AD[63:32] bus, CB/E[7:4] bus, and PAR64.

For the example illustrated in FIG. 11, an address parity error on the lower PCI bus is assumed. The target may use the address parity error information to control its transaction setup response to the initiator. Since the address parity error was on the lower PCI bus, the target asserts SWAP_ACK# but not ACK64# (Swap enabled bit 504 may also be set), and asserts TRDY# at CLK 4. This tells the target to transfer data on the upper PCI bus only. If no data parity error(s) is detected by the initiator on the upper PCI bus, then the read transaction proceeds to completion. The present invention, thus, dynamically configures the functional data path for the read transaction without having to request a Retry or Abort. The present invention may also issue a Retry or Abort after setting the 64-Bit disabled bit 502 and/or Swap enabled bit 504 in the initiator. Then when the initiator starts a new transaction with this target, SWAP# will be asserted (Swap enabled bit 504 was previously set) but not REQ64#. The data initially asserted by the target on the lower PCI bus (data-1) and the upper PCI bus (data-2) at CLK 4 is repeated on the upper PCI bus at CLK 5 and CLK 6, respectively. The last data transfer is indicated by FRAME# being deasserted at CLK 9. REQ64# is deasserted after CLK 4 by the initiator once it has been determined that data transfers will occur over only the upper PCI bus.

Figure 12A:
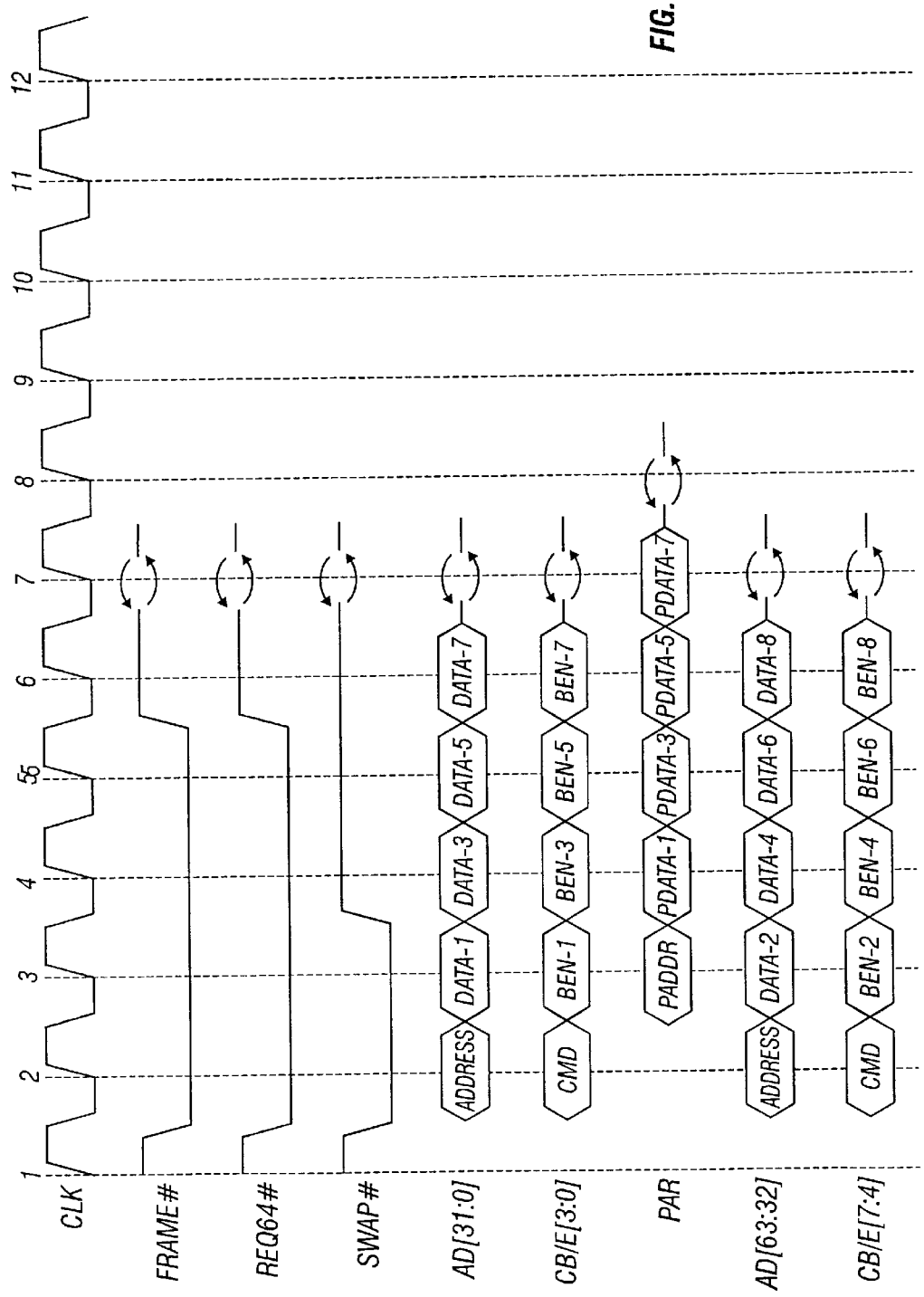

Referring now to FIG. 12, a schematic timing diagram is illustrated of a 64-bit data-width write transaction having a data parity error on the upper PCI bus. Assume that a PCI initiator has arbitrated for and obtained (owns) the PCI bus (not illustrated), now during PCI clock 1 (CLK1), FRAME#, REQ64#, and SWAP# are asserted by the PCI initiator. There are no predisposed restrictions set in the PCI initiator (i.e., 64-Bit disabled bit or Swap enabled bit are not set). Also during CLK 1 the transaction address is asserted on both the AD[31:0] and AD[63:32] buses, and the transaction command is asserted on both CB/E[3:0] and CB3E[7:0] buses. Applying the transaction address and command during the address phase of the PCI transaction redundantly to both the lower and upper PCI buses may allow the target to determine whether one or both of the PCI buses has a fault by calculating whether there exists a parity error for the transaction address on either or both of the PCI buses, as disclosed above for the example illustrated in FIG. 6.

Once the target decodes its address, it will assert DEVSEL# and may assert ACK64# which indicates that a 64-bit data-width transaction during the data phase may proceed. Once IRDY# and TRDY# are asserted, data may be transferred from the initiator to the target during the data phase write transaction. Since SWAP_ACK# was not asserted by the target, the initiator may deassert SWAP# since it serves no further purpose in the instant transaction.

The last data transfer is indicated by FRAME# being deasserted.

The initiator calculates values for PAR and PAR64, and asserts them one clock after the respective address or data values, so that an even parity is generated in conjunction with the combination of the AD[31:0] and CB/E[3:0] buses, and the AD[63:32] and CB/E[7:3] buses, respectively. The target uses the number of 1's received on the AD[31:0] bus, CB/E[3:0] bus and PAR to verify that an even parity was received on the lower PCI bus, and number of 1's received on the AD[63:32] bus, CB/E[7:4] bus and PAR64 to verify that an even parity was received on the upper PCI bus.

In the example illustrated in FIG. 12, the target does not calculate during the data phase an even parity on the upper PCI bus and it asserts PERR#. The clock after the target asserts PERR#, the target deasserts TRDY# and DEVSEL#, and asserts STOP#. This indicates to the initiator a "Target-Abort" and the initiator driver software and, possibly, the operating system software may be alerted and attempt to recover from this Target-Abort. The 64-Bit disabled bit 502 may be set in this target so that during the next PCI write transaction the target will not assert ACK64#, thus preventing the use of the upper PCI bus having the parity error.

In a similar fashion, a parity error on the lower PCI bus may be avoided by setting the Swap enabled bit 504 in the target command register 402, then during the next PCI write transaction, assuming the upper PCI bus is free of parity errors, the target will assert SWAP# but not ACK64#, thus preventing the use of the lower PCI bus having the parity error.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a fault-tolerant interconnection system for connecting a processor and memory to at least one peripheral device, said computer system comprising:
   a processor and memory connected to at least one peripheral device with a fault-tolerant interconnection system;
   said fault-tolerant interconnection system comprising:
      a data and control bus having first and second portions;
      an initiator interface connected to said data and control bus;
      a target interface connected to said data and control bus;
      said initiator interface generating a first parity when transmitting data on the first portion and a second parity when transmitting data on the second portion of said data and control bus;
      said target interface checking the first parity when receiving data on the first portion and the second parity when receiving data on the second portion of said data and control bus;
      said target interface generating the first parity when transmitting data on the first portion and the second parity when transmitting data on the second portion of said data and control bus;
      said initiator interface checking the first parity when receiving data on the first portion and the second parity when receiving data on the second portion of said data and control bus; wherein,
         if a first parity error is detected on the first portion then a data transaction is performed over the second portion of said data and control bus;
         if a second parity error is detected on the second portion then the data transaction is performed over the first portion of said data and control bus; and
         if both the first and second parity errors are detected then no data transaction is performed; and
      wherein:
         said initiator interface requests said target interface for the data transaction to be performed over the first and second portions of said data and control bus; and
         said target interface responds to said initiator interface, whereby:
            an acknowledge first and second portions signal indicates the data transaction may be performed over the first and second portions;
            an acknowledge first portion signal indicates the data transaction may be performed over the first portion; and
            an acknowledge second portion signal indicates the data transaction may be performed over the second portion of said data and control bus.

2. The computer system of claim 1, wherein:
   said initiator interface requests said target interface for the data transaction to be performed over the first portion of said data and control bus; and
   if said target interface responds to said initiator interface with the acknowledge first portion signal then the data transaction may be performed over the first portion of said data and control bus.

3. The computer system of claim 1, wherein:
   said initiator interface requests said target interface for the data transaction to be performed over the second portion of said data and control bus; and
   if said target interface responds to said initiator interface with the acknowledge second portion signal then the data transaction may be performed over the second portion of said data and control bus.

4. The computer system of claim 1, wherein the acknowledge first and second portions signal is sent to said initiator interface only after said target interface determines that the first and second parity errors are not detected.

5. The computer system of claim 1, wherein the acknowledge first portion signal is sent to said initiator interface only after said target interface determines that the first parity error is not detected.

6. The computer system of claim 1, wherein the acknowledge second portion signal is sent to said initiator interface only after said target interface determines that the second parity error is not detected.

7. A computer system having a fault-tolerant interconnection system for connecting a processor and memory to at least one peripheral device, said computer system comprising:
   a processor and memory connected to at least one peripheral device with a fault-tolerant interconnection system;
   said fault-tolerant interconnection system comprising:
      a data and control bus having first and second portions;
      an initiator interface connected to said data and control bus;

a target interface connected to said data and control bus;

said initiator interface generating a first parity when transmitting data on the first portion and a second parity when transmitting data on the second portion of said data and control bus;

said target interface checking the first parity when receiving data on the first portion and the second parity when receiving data on the second portion of said data and control bus;

said target interface generating the first parity when transmitting data on the first portion and the second parity when transmitting data on the second portion of said data and control bus;

said initiator interface checking the first parity when receiving data on the first portion and the second parity when receiving data on the second portion of said data and control bus; wherein, if a first parity error is detected on the first portion then a data transaction is performed over the second portion of said data and control bus;

if a second parity error is detected on the second portion then the data transaction is performed over the first portion of said data and control bus; and if both the first and second parity errors are detected then no data transaction is performed; and wherein said fault-tolerant interconnection system complies with a peripheral component interface specification and has a 64-bit data-width bus, and the first and second portions are each 32-bit data-width.

8. A method, in a computer system having a fault-tolerant interconnection system for connecting a processor and memory to at least one peripheral device, said method comprising the steps of:

providing a processor and memory connected to at least one peripheral device with a fault-tolerant interconnection system;

providing said fault-tolerant interconnection system having:

a data and control bus having first and second portions;

an initiator interface connected to said data and control bus;

a target interface connected to said data and control bus; wherein, generating a first parity when said initiator interface transmits data on the first portion and a second parity when said initiator interface transmits data on the second portion of said data and control bus;

checking the first parity when said target interface receives data on the first portion and the second parity when said target interface receives data on the second portion of said data and control bus;

generating the first parity when said target interface transmits data on the first portion and the second parity when said target interface transmits data on the second portion of said data and control bus;

checking the first parity when said initiator interface receives data on the first portion and the second parity when said initiator interface receives data on the second portion of said data and control bus; wherein, if a first parity error is detected on the first portion then performing a data transaction over the second portion of said data and control bus;

if a second parity error is detected on the second portion then performing the data transaction over the first portion of said data and control bus; and if both the first and second parity errors are detected then aborting the data transaction;

requesting by said initiator interface that the data transaction be performed over the first and second portions of said data and control bus; and responding by said target interface to said initiator interface request, whereby:

responding with an acknowledge first and second portions signal to indicate that the data transaction may be performed over the first and second portions;

responding with an acknowledge first portion signal to indicate that the data transaction may be performed over the first portion; and responding with and acknowledge second portion signal to indicate that the data transaction may be performed over the second portion of said data and control bus.

\* \* \* \* \*